US010349205B2

(12) United States Patent
Glover et al.

(10) Patent No.: US 10,349,205 B2
(45) Date of Patent: Jul. 9, 2019

(54) LOCATION-BASED APPLICATION SEARCH

(71) Applicant: Samsung Electronics Co., Ltd., Suwon-si, Gyeonggi-do (KR)

(72) Inventors: Eric J. Glover, Palo Alto, CA (US); Michael Harris, Mountain View, CA (US); James Delli Santi, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 26 days.

(21) Appl. No.: 14/954,384

(22) Filed: Nov. 30, 2015

(65) Prior Publication Data
US 2016/0188602 A1 Jun. 30, 2016

Related U.S. Application Data

(60) Provisional application No. 62/098,926, filed on Dec. 31, 2014.

(51) Int. Cl.
G06F 7/00 (2006.01)
G06F 17/30 (2006.01)
H04W 4/021 (2018.01)
H04L 29/08 (2006.01)
G06Q 10/10 (2012.01)
(Continued)

(52) U.S. Cl.
CPC ........ H04W 4/021 (2013.01); G06F 16/9537 (2019.01); G06Q 10/10 (2013.01); G06Q 50/01 (2013.01); H04L 67/18 (2013.01); H04L 61/609 (2013.01)

(58) Field of Classification Search
CPC ....... H04B 7/26; G06F 17/30; G06F 17/3087; G06F 3/04842; G06F 8/61; G06F 17/30241; G06F 17/30424; G06F 17/3053; G06F 17/30864; G06F 17/30867; G06F 17/30882; G06Q 10/067; G06Q 30/0282;
(Continued)

(56) References Cited

U.S. PATENT DOCUMENTS 8,060,497 B1* 11/2011 Zatsman ........... G06F 17/30864
707/723
2013/0132896 A1* 5/2013 Lee ................... G06F 17/30997
715/808

(Continued)

Primary Examiner — Tuan A Pham
Assistant Examiner — Thai V Dang
(74) Attorney, Agent, or Firm — Jefferson IP Law, LLP

(57) ABSTRACT

A server computing system including a storage device and a processing device. The storage device storing application records including application attributes and location data indicating a geographic area associated with an application. The processing device configured to receive a search query comprising a search term, identify application records stored by comparing the search term with the application attributes, and determine a search location. The processing device also configured to: for each of the identified application records, compute a distance scoring feature based on a distance between the search location and the geographic area indicated in the application record and determine a relevance score for the application record based on the distance scoring feature; select download addresses from the application records based on the relevance scores; and transmit the download addresses to the client computing device.

23 Claims, 11 Drawing Sheets

(51) Int. Cl.
*G06Q 50/00* (2012.01)
*G06F 16/9537* (2019.01)
*H04L 29/12* (2006.01)

(58) Field of Classification Search
CPC ......... G06Q 30/00; H04L 67/10; H04L 67/18;
H04W 4/022; H04W 4/021
USPC ........................................................ 707/749
See application file for complete search history.

(56) References Cited

U.S. PATENT DOCUMENTS

| | | | | |
|---|---|---|---|---|
| 2014/0052683 | A1* | 2/2014 | Kirkham | G06Q 30/0631 706/46 |
| 2014/0250106 | A1* | 9/2014 | Shapira | G06F 17/30864 707/722 |
| 2015/0161149 | A1* | 6/2015 | Genera | G06F 17/3087 707/711 |

* cited by examiner

LOCATION-BASED APPLICATION SEARCH

CROSS REFERENCE TO RELATED APPLICATIONS

This U.S. patent application claims priority under 35 U.S.C. § 119(e) to U.S. Provisional Application 62/098,926, filed on Dec. 31, 2014, which is hereby incorporated by reference in its entirety.

TECHNICAL FIELD

This disclosure relates to generating application search results based on a geographic location.

BACKGROUND

In recent years, use of computers, smartphones, and other Internet-connected devices has grown exponentially. Correspondingly, the number of available software applications for such devices has also grown. Today, many diverse native and web software applications can be accessed by various devices, for example, by smartphones, personal computers, automobiles, or televisions. Applications may include business driven applications, games, educational applications, news applications, shopping applications, messaging applications, media-streaming applications, social networking applications, etc. Furthermore, some application developers develop numerous applications within some genres and some applications may have several editions.

SUMMARY

One aspect of the present disclosure provides a server computing system for searching applications. The server computing system may include a network communication device, a storage device, and a processing device. The storage device may store an application data store that stores application records. Each application record may correspond with an application. Each application record may include an application title of the application, an application description of the application, an application download address of the application, and/or location data indicating a geographic area associated with the application. The processing device may be in electronic communication with the network communication device, and the storage device. The processing device may be configured to receive an application search query from a client computing device via the network communication device. The application search query may include one or more search terms.

The processing device can identify application records stored in the application data store by comparing the search terms in the search query with the application titles and the application descriptions of the application records stored in the application data store. The processing device determines a search location associated with the application search query. The search location may include one or more of a location specified in the search query, and a location of the client computing device. For each of the identified application records, the processing device may compute a distance scoring feature based on a distance between the search location and the geographic area indicated by the location data of the application record. The processing device may determine a relevance score for the application record based on the distance scoring feature computed for the application record. The processing device may select application download addresses from the application records based on the relevance scores of the application records. The processing device can transmit the selected application download addresses to the client computing device via the network communication device.

Another aspect of the disclosure provides a computing device (e.g., a mobile computing device). The computing device may include a touchscreen display, a microphone, a transceiver, a non-transitory memory, and a computing processor. The non-transitory memory may store a plurality of application records. Each application record may include an application identifier, an application title, an application icon, and location data indicating a geographic area associated with an application corresponding with the application record. The computing processor may be in electronic communication with the touchscreen display, the microphone, the transceiver, and the non-transitory memory. The computing processor may execute computer-readable instructions that cause the computing processor to display a search box on the touchscreen display. The computing processor receives an application search query via one of the touchscreen display and the microphone. The application search query comprises one or more search terms. The computing processor displays the application search query in the search box.

The computing processor determines a search location associated with the application search query. The search location may include one or more of a location specified in the application search query, and a location of the computing device. The computing processor generates a consideration set of application records. For each application record in the plurality of application records, the computing processor may compare the search terms in the search query with the application title stored in the application record, include the application record in the consideration set of application records in response to one or more of the search terms matching the application title, and excluding the application record from the consideration set of application records in response to the search terms not matching the application title.

For each application record in the consideration set of application records, the computing processor may compute a distance scoring feature based on a distance between the search location and the geographic area indicated by the location data in the application record, and determine a relevance score for the application record based on the distance scoring feature computed for the application record. The computing processor may select application identifiers from the application records based on the relevance scores of the application records. The computing processor can display the selected application identifiers on the touchscreen display based on the relevance scores of the selected application identifiers.

BRIEF DESCRIPTION OF DRAWINGS

The details of one or more examples are set forth in the accompanying drawings and the description below. Other features, objects, and advantages will be apparent from the description and drawings, and from the claims.

DETAILED DESCRIPTION

The figures and the following description relate to example implementations by way of illustration only. It should be noted that from the following discussion, alternative implementations of the structures and methods disclosed herein will be readily recognized as viable alternatives that may be employed without departing from the scope of the disclosure.

Figure 1:
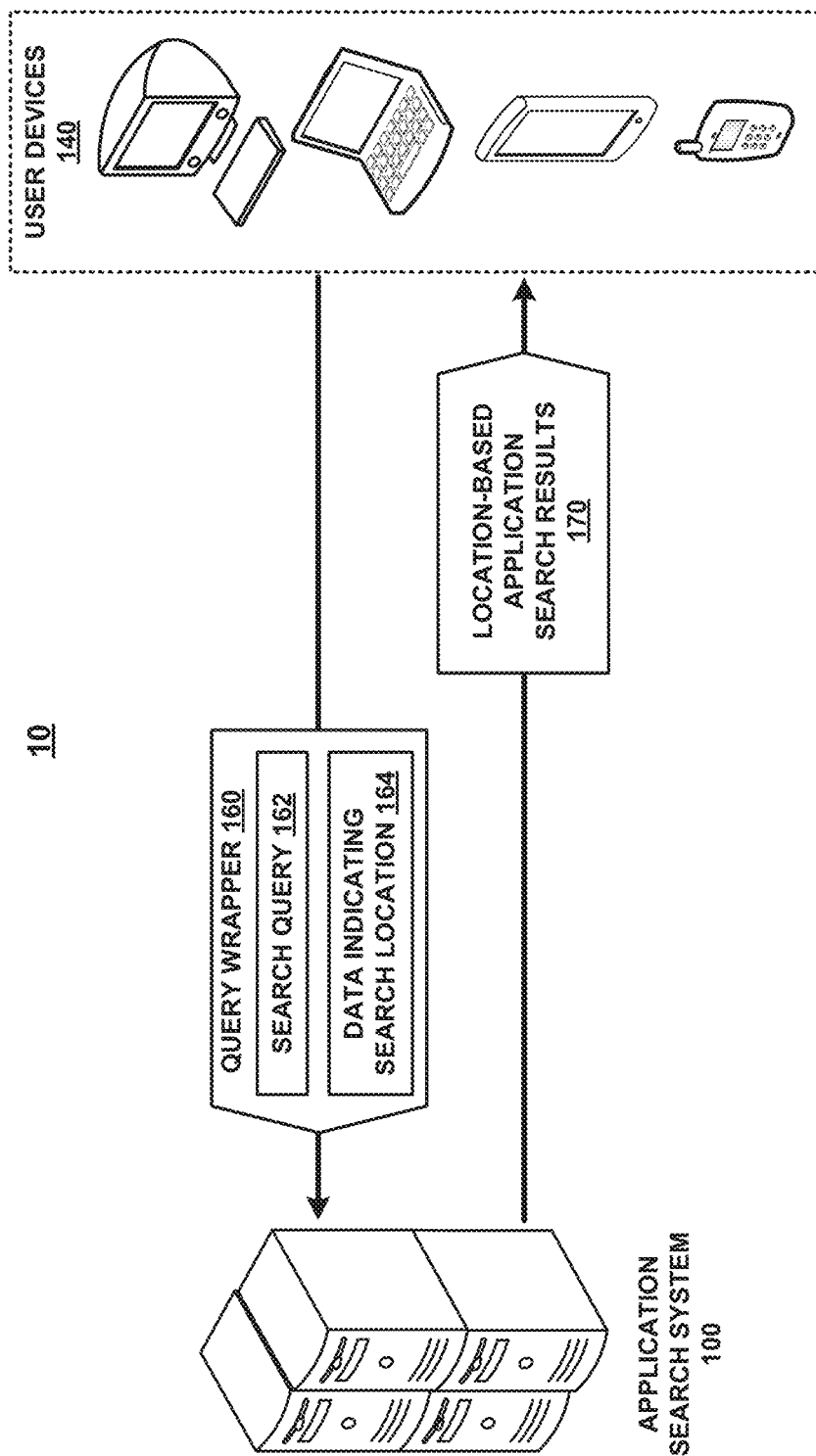
FIG. 1 illustrates an example system for facilitating an application search.

FIG. 1 is a functional block diagram illustrating an example environment 10 that includes an application search system 100 ("search system 100", hereinafter) and user devices 140. The search system 100 implements location-based search for software applications ("applications", hereinafter). The search system 100 may receive a query wrapper 160, for example, from a user device 140. The query wrapper 160 may include an application search query 162 ("search query 162", hereinafter). The query wrapper 160 may include data 164. The data 164 may indicate a search location. For example, the data 164 may include the search location. The data 164 may include information that the search system 100 may use to determine the search location. For example, the data 164 may include an Internet Protocol (IP) address, a user device identifier (ID), a Wi-Fi network ID, platform data, etc. The search system 100 may generate location-based application search results 170 ("search results 170", hereinafter). The search system 100 may generate the search results 170 based on the search query 162 and the search location. The search results 170 may include links to download applications. The search system 100 may transmit the search results 170 to the user device 140.

The search location may include a location that is specified in the search query 162 (e.g., a query-specified location). The search location may include a location of a user device 140 that initiated the search query 162 (e.g., a user device location). The search location may include more than one location. For example, the search location may include the query-specified location and the user device location. The search system 100 may receive the search location as part of the data 164. The search system 100 may determine the search location based on the data 164. For example, the search system 100 may determine a user device location based on information included in the data 164. The search system 100 may determine the search location by identifying a location specified in the search query 162.

The search system 100 may communicate with the user devices 140 via a network (not shown). The network may include a local area network (LAN), wide area network (WAN), the Internet, and/or the like. The search system 100 may communicate with the user devices 140 via a partner computing system (e.g., an internet search provider, or a cellular service provider). For example, a user of the user device 140 may enter the search query 162 in a search bar provided by an internet search provider. The internet search provider may determine that the search query 162 relates to an application search and forward the search query 162 to the search system 100. The search system 100 may be referred to as a server computing system. The user devices 140 may be referred to as client computing devices.

Figure 2:
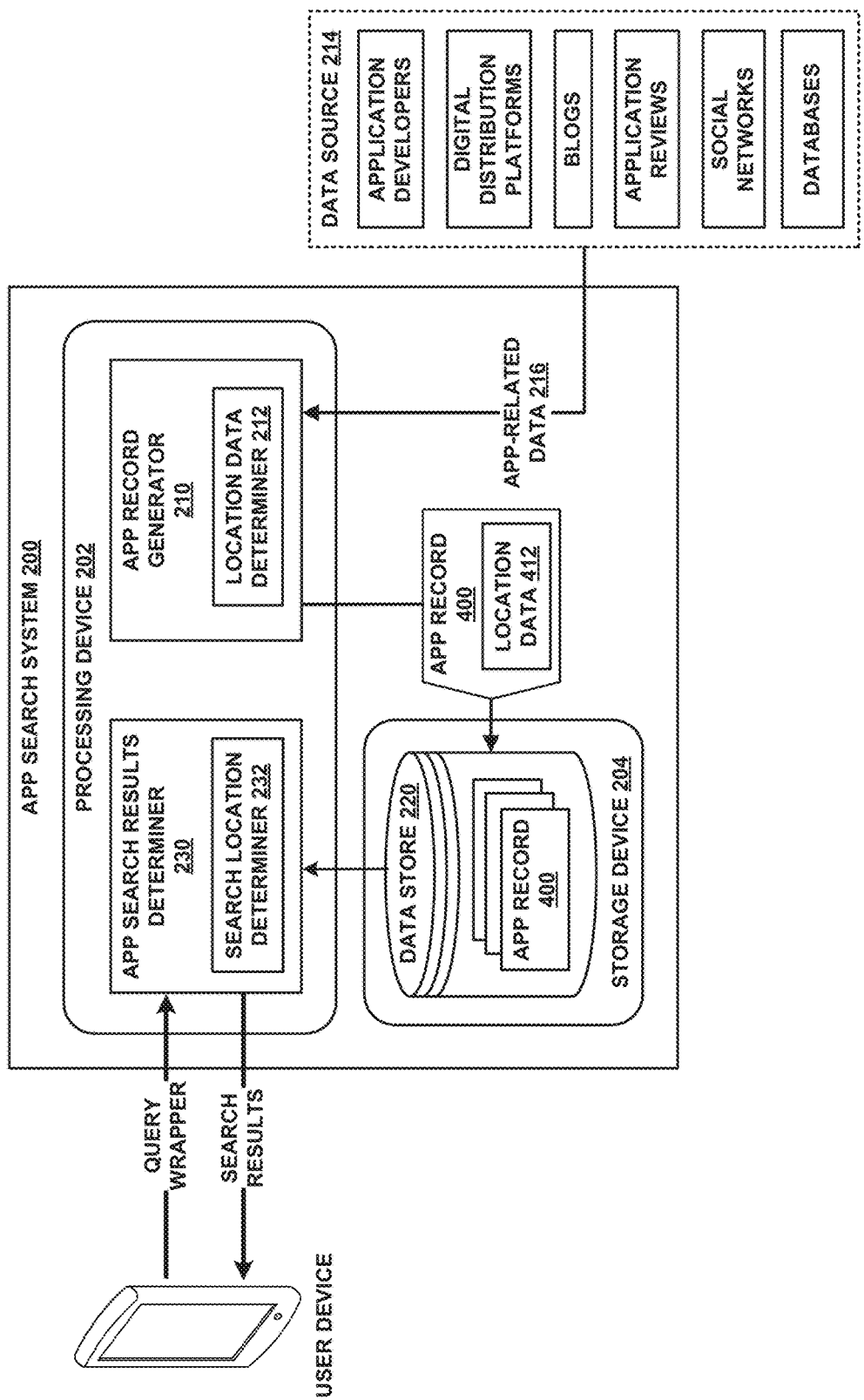
FIG. 2 illustrates a block diagram of an example application search system.

FIG. 2 is a block diagram of an example application search system 200 ("search system 200", hereinafter). The search system 200 may implement the search system 100. The search system 200 receives an application search query and transmits location-based application search results in response to the application search query. For example, the search system 200 may receive the search query 162 and transmit the search results 170. The search system 200 may include a processing device 202, a storage device 204, and a network communication device (not shown).

The processing device 202 may include a collection of one or more processors that execute computer readable instructions. The processors of the processing device 202 may operate independently, or in a distributed manner. The processors may be connected via a bus and/or a network. The processors may be located in the same physical device (e.g., same housing). The processors may be located in different physical devices (e.g., different housings, for example, in a distributed computing system). The processing device 202 may include physical central processing units (pCPUs). The processing device 202 may include virtual central processing units (vCPUs). The processing device 202 may implement an application record generator 210 (record generator 210, hereinafter) and an application search results determiner 230 (search results determiner 230, hereinafter). The processing device 202 may execute instructions, stored in the storage device 204, that cause the processing device 202 to implement the record generator 210 and the search results determiner 230.

The storage device 204 stores data. The storage device 204 may include a computer readable storage medium. For example, the storage device 204 may include solid state memory devices, hard disk memory devices, optical disk drives, a read-only memory, nanotube-based storage devices, or the like. The storage device 204 may be connected to the processing device 202 via a bus and/or a network. Different storage mediums within the storage device 204 may be located at the same physical location (e.g., in the same data center, same rack, or same housing). Different storage mediums of the storage device 204 may be distributed (e.g., in different data centers, different racks, or different housings). The storage device 204 may implement an application data store 220 (data store 220, hereinafter). The storage device 204 may store the data store 220.

The network communication device (not shown) may communicate with a network. The network communication device may include one or more communication interfaces that perform wired communication (e.g., via Ethernet, or fiber-optic cables). The network communication device may perform wireless communication (e.g., via Wi-Fi, cellular network, or satellites). The network communication device may include a transceiver that communicates with the network in accordance with an Institute of Electrical and Electronics Engineers (IEEE) specification (e.g., Ethernet, Wireless Local Area Network (LAN), or the like). The network communication device may include a transceiver that communicates with the network in accordance with a 3rd Generation Partnership Project (3GPP) specification (e.g., Code Division Multiple Access (CDMA), Long Term Evolution (LTE), LTE-Advanced, or the like). The network communication device may include a transceiver that communicates with the network in accordance with a Universal Serial Bus (USB) specification (e.g., via a USB port).

The search system 200 may be implemented by a cloud computing platform. The cloud computing platform may include a collection of remote computing services. The cloud computing platform may include computing resources (e.g., processing device 202). The computing resources may include servers (e.g., physical servers, or virtual servers). The cloud computing platform may include networking resources (e.g., network communication device). For example, the networking resources may distribute incoming application search queries across multiple virtual private servers. The cloud computing resources may include storage resources (e.g., storage device 204). The storage resources may include database servers that may support NoSQL, MySQL, Oracle, SQL Server, or the like. Example cloud computing platforms include Amazon Web Services, and Google Cloud Platform.

The record generator 210 generates application records (e.g., application records 400). An application record may correspond with an application and include information related to the application. The record generator 210 may store the application records in the data store 220. The record generator 210 may update an existing application record stored in the data store 220. The record generator 210 may use one or more data sources 214 to generate an application record. The record generator 210 may retrieve application-related data 216 ("app-related data 216", hereinafter) from a data source 214. The record generator 210 may use the app-related data 216 to generate the application record 400. The record generator 210 may update an application record, for example, when the corresponding application is updated.

The record generator 210 may retrieve application-related data 216 from one or more of the data sources 214. The record generator 210 may use the data retrieved from the data sources 214 to create and/or update one or more databases, indices, tables (e.g., an access table), files, or other data structures stored in the data store 220. For example, the record generator 210 may create new application records and update existing application records based on data retrieved from the data sources 214. An operator (e.g., a human operator) may manually generate data for the application records. For example, the operator may provide data to the record generator 210 via a GUI. The record generator 210 may update (e.g., periodically update) the data included in the application records, for example, so that the search system 200 provides up-to-date results.

The data sources 214 may include data from different data providers. The data sources 214 may include data from application developers, such as application developers' websites and data feeds provided by developers. The data sources 214 may include operators of digital distribution platforms configured to distribute native applications to user devices 140. Example digital distribution platforms include GOOGLE PLAY® digital distribution platform by Google, Inc., APP STORE® digital distribution platform by Apple, Inc., and WINDOWS PHONE® Store developed by Microsoft Corporation.

The data sources 214 may include websites, such as websites that include web logs (e.g., blogs), application review websites, or other websites including application-related data. The data sources 214 may include social networking sites, such as "FACEBOOK®" by Facebook, Inc. (e.g., Facebook posts) and "TWITTER®" by Twitter Inc. (e.g., text from tweets). Data sources 214 may include online databases that include data related to movies, television programs, music, and restaurants. Different data sources may have different content and different update rates. The data sources 214 may include an application, for example, a manifest associated with the application. The data sources 214 may include source code of an application.

The search system 200 (e.g., record generator 210) retrieves application-related data 216 from one or more of the data sources 214. Examples of application-related data 216 include an application name, an application description, a substantive review of an application, a quality rating of an application, a developer name, an excerpt from a blog post about an application, a tweet about an application, image(s) associated with the application (e.g., icons and/or screenshots), and/or the like. The search system 200 may retrieve statistical data from the data sources 214. Statistical data may include numerical data related to an application, such as number of downloads, download rates (e.g., downloads per month), number of reviews, and/or number of ratings. The application-related data 216 may include information regarding the functionalities of applications (e.g., functions that an application can perform).

The record generator 210 may include a location data determiner 212. The location data determiner 212 may determine location data (e.g., location data 412) associated with an application. The location data associated with an application may indicate one or more geographic locations where the application may be relevant. An application may be relevant at a location, for example, if a particular function of the application is operational at the location. An application may be relevant at a location, for example, if an application function is usable at the location. An application may be relevant at a location, for example, if a majority of application functions are operable at the location. An application may be relevant at a location, for example, if a threshold number of application functions are functional at the location (e.g., 50-100% of application functions are available). An application may be relevant at a location, for example, if an application service is available at the location. For example, a food delivery application (e.g., the Eat24 application by Yelp, Inc.) may be relevant at a location, if the food delivery application likely offers food delivery at or near the location.

The location data determiner 212 may determine the location data based on the app-related data 216 retrieved from the data source 214. The location data determiner 212 may include the location data associated with an application in the application record. The record generator 210 may include other app-related information in the application record. For example, the application record 400 may include an application name, an application ID, application attribute(s), application description, an application download address, link data, or the like. The application record may include statistical information, for example, a number of application downloads, installations, uses and/or uninstallations.

The location data determiner 212 may include geographic parameter(s) in the location data to indicate a geographic area associated with an application. Example geographic parameters include a geographic coordinate, a geographic perimeter, a radius, etc. The location data determiner 212 may include a geographic coordinate in the location data (e.g., coordinate 418). The geographic coordinate may indicate that the application is associated with the geographic coordinate. For example, a particular function of the application may function at or near the geographic coordinate and not elsewhere. The location data determiner 212 may indicate the geographic coordinate by including a latitude value and a longitude value in the location data.

The location data determiner 212 may include a geographic perimeter in the location data (e.g., perimeter 420). The geographic perimeter may indicate a geographic area associated with the application. The geographic perimeter may refer to a geographic area where a particular functionality of the application functions. The application may not function outside the geographic perimeter indicated by the location data. The application may be more relevant to users inside the geographic perimeter and less relevant to users outside the geographic perimeter. The location data determiner 212 may indicate the geographic perimeter by indicating dimensions of a geometrical shape. For example, the location data determiner 212 may indicate a rectangular perimeter by indicating a length and a width of the rectangular perimeter.

The location data determiner 212 may indicate the geographic perimeter by indicating a geographic coordinate (e.g., coordinate 426) and a radius value (e.g., radius value 428). The coordinate and the radius value may indicate a circular perimeter. The coordinate may refer to a center of the circular perimeter. The radius value may refer to a radius of the circular perimeter. The geographic perimeter may refer to the boundary of a city, a metropolitan, a county, a state, a country and/or a continent. For example, the geographic perimeter for an application that is operational (e.g., only operational) in the San Jose-San Francisco-Oakland Bay Area may include 'Bay Area'.

The location data determiner 212 may indicate the location data of an application by referring to a proper noun. The location data of an application may refer to a state, or a province. For example, the location data for a gambling application may refer to a state where the gambling application is legal. The location data of an application may refer to a metropolitan, a city, or a town. For example, the location data for a local transit application may refer to a metropolitan where the transit operates. The location data of an application may refer to a county, a town, or a village. For example, the location data for a county application that provides updates on land registrations may refer to the county where the land registrations are filed.

The location data determiner 212 may indicate the location data of an application by referring to a zip code, or a postal code. For example, the location data for a food delivery application may include zip codes where the food delivery service is offered. The location data of an application may include a telephone area code. The location data of an application may include a postal address. For example, the location data for an application for the Department of Defense may include an address of the Pentagon. The location data of an application may include a man-made landmark. For example, the location data of an application for Taj Mahal may refer to the Taj Mahal. The location data of an application may include a natural landmark. For example, the location data of an application for Mount Everest may refer to the Mount Everest.

The location data of an application may indicate a location where the application may be irrelevant. An application may be irrelevant at a location, for example, if an application function is inoperable at the location. An application may be irrelevant at a location, for example, if a majority of application functions malfunction at the location. An application may be irrelevant at a location, for example, if a threshold number of application functions are unavailable at the location (e.g., 50-100%/o of application functions are unavailable). An application may be irrelevant at a location, for example, if an application service is unavailable at the location. An application may be irrelevant at a location, for example, if the application is banned at the location.

The location data may indicate a geographic coordinate and/or a geographic perimeter where the application may be irrelevant. For example, the state of Virginia may have banned a ride-sharing application (e.g., Uber, Lyft, etc.). The location data of the ride-sharing application may include a geographic perimeter that corresponds with Virginia state boundaries. The location data of the ride-sharing application may indicate that the ride-sharing application is irrelevant inside the geographic perimeter, for example, because the ride-sharing application is banned within the geographic perimeter.

The location data determiner 212 may determine (e.g., generate) location data for an application based on parameters associated with the application. Example parameters associated with the application include an entity associated with the application, a location of the entity, a type of the entity, etc. The location data determiner 212 may generate the location data based on the location(s) of entities that are associated with the application. The location data determiner 212 may set the location data of the application to be the same as the location of the entities associated with the application. The location data determiner 212 may indicate the location data of the application by selecting a geographic perimeter that include the locations of a threshold number of entities associated with the application (e.g., geographic perimeter may include 90% of entity locations). The location data determiner 212 may select the geographic perimeter such that the geographic perimeter excludes entity locations that may be considered outliers (e.g., more than a threshold distance from most other entity locations). Example entities include a movie theater, a restaurant, a department store, etc.

An entity location may include a zip code, or a postal code of an area where the entity is located. For example, the location data for a local theater application may include the zip code of the theater. The location data determiner 212 may include neighboring zip codes, for example, to increase a relevance area of the location theater application. The location data determiner 212 may include a delivery range in the location data of a delivery application. For example, the location data for a local pizzeria app may include zip codes where the pizzeria delivers.

The location data determiner 212 may determine the location data for an application based on app-related data 216. The app-related data 216 may include application download data. The application download data may include a number of downloads of the application. The application download data may include a location corresponding with an application download. For example, the application download data may include the location corresponding with each application download. The application download data may indicate a zip code, a city, a metropolitan area, a county, or a state corresponding with a particular download. The application download data may not include a specific address corresponding with a particular download, for example, to protect the privacy of a user who downloaded the application. The application download data may include a specific address corresponding with a particular download, for example, if a user has granted access to use the specific address.

The location data determiner 212 may determine location data for an application based on the application download data associated with the application. The location data determiner 212 may select a geographic perimeter to include all download locations. The location data determiner 212 may indicate the location data by selecting a geographic perimeter that includes a selected portion of download locations. The location data determiner 212 may include a geographic area in the geographic perimeter, for example, if an application download density in the geographic area exceeds a download density threshold. The location data determiner 212 may omit a geographic area from the geographic perimeter, for example, if an application download density in the geographic area is below the download density threshold. The download density threshold may be determined by the search system 200, a digital distribution platform, a user of the user device, etc.

The location data determiner 212 may determine location data for an application based on application installation data. The location data determiner 212 may receive the application installation data from the data source 214, for example, as part of app-related data 216. The application installation data may include a location corresponding with an application installation (e.g., each application installation). The location data determiner 212 may select a geographic perimeter to include all installation locations. The location data determiner 212 may indicate the location data by selecting a geographic perimeter that includes a selected portion of installation locations. The location data determiner 212 may include a geographic area in the geographic perimeter, for example, if an application installation density in the geographic area exceeds an installation density threshold. The location data determiner 212 may omit a geographic area from the geographic perimeter, for example, if an application installation density in the geographic area is below the installation density threshold. The installation density threshold may be determined by the search system 200, a digital distribution platform, a user of the user device, etc.

The location data determiner 212 may determine location data for an application based on application usage data. The location data determiner 212 may receive the application usage data from the data source 214, for example, as part of app-related data 216. The application usage data may indicate an amount of time the application was used by a user (e.g., each user that installed the application). The amount of time that an application is used may be measured may be over a selected time period (e.g., a week, a month, a quarter, a year, etc.). The application usage data may include an average amount of time that users in a particular geographic area used the application. For example, the application usage data for a gaming application may indicate the average amount of time that users in New York City played games through the gaming application. The location data determiner 212 may receive the application usage data from the user devices. The location data determiner 212 may receive the application usage data from a remote server that records application usage times.

The location data determiner 212 may use the application usage data to select a geographic perimeter for an application. The location data determiner 212 may compare an average application usage time within a particular geographic area with a usage time threshold. The location data determiner 212 may include a geographic area within the geographic perimeter, for example, if an average application usage time within the geographic area exceeds the usage time threshold. The location data determiner 212 may omit a geographic area from the geographic perimeter, for example, if an average application usage time within the geographic area is below the usage time threshold. The location data determiner 212 may determine the usage time threshold based on information received from a developer of the application, a user, the digital distribution platform, etc.

The location data determiner 212 may determine location data for an application based on application uninstallation data. The location data determiner 212 may receive the application uninstallation data from the data source 214, for example, as part of app-related data 216. The application uninstallation data may include a number of application uninstallations within a particular geographic area. The location data determiner 212 may determine an uninstallation density based on the application uninstallation data. The location data determiner 212 may omit or remove a geographic area from a geographic perimeter, for example, if the uninstallation density within the geographic area exceeds an uninstallation density threshold. The location data determiner 212 may subtract a number of uninstallations from a number of installations to determine a net number of installations. The location data determiner 212 may include a geographic area within a geographic perimeter, for example, if the net number of installations is above an application installations threshold.

The location data determiner 212 may determine location data for an application based on application-specific data. The location data determiner 212 may receive the application-specific data from the data source 214, for example, as part of app-related data 216. The application-specific data may indicate a location where an application function may be operational. For example, an application description in a digital distribution platform may indicate that an application function is operational in a particular metropolitan (e.g., description of a ride-sharing application may indicate that it is available in New York). The application-specific data may indicate a location where an application service may be available (e.g., description of a food delivery application may indicate that it is only available in the Bay Area).

The location data determiner 212 may determine location data for an application based on application reviews. The location data determiner 212 may receive application reviews that application users may have posted on digital distribution platforms, blogs, or review posting applications (e.g., Yelp). The location data determiner 212 may analyze the application reviews to determine a sentiment of the application reviews. The location data determiner 212 may omit a geographic area from the location data, for example, if the general sentiment within the geographic positive is negative. The location data determiner 212 may include a geographic area in the location data, for example, if the general sentiment within the geographic area is positive. The location data determiner 212 may include a geographic area in the location data, for example, if an average of application ratings within the geographic area is above a threshold. The location data determiner 212 may omit or remove a geographic area from the location data, for example, if an average of application ratings within the geographic area is below a threshold.

The location data determiner 212 may determine the location data for an application based on input from an operator (e.g., a human operator). The operator may manually generate the location data. The operator may determine the location data based on a number of application installations (e.g., by comparing application installation densities with an installation density threshold). The operator may determine the location data based on a number of application downloads (e.g., by comparing application download densities with a download density threshold). The operator may determine the location data based on a number of application uses (e.g., by comparing application usage time with a threshold usage time). The operator may determine the location data based on a number of application uninstalls (e.g., by comparing application uninstallation densities with an uninstallation density threshold). The operator may determine the location data based on application-specific data (e.g., application description, application reviews, application ratings, or the like).

The location data determiner 212 may update the location data of an application. The location data determiner 212 may update the location data periodically (e.g., once a day, once a week, once a quarter, or the like). The location data determiner 212 may update the location data when the application has been updated, for example, when a new version of the application is released. The location data determiner 212 may update the location data based on a change in the app-related data 216. For example, the location data determiner 212 may update the location data based on changes in the application download data, application installation data, application usage data, application uninstallation data, application-specific data, application reviews, application ratings, or the like.

The location data determiner 212 may update the location data based on a change in application download data. The location data determiner 212 may include a geographic area in the location data, for example, if an application download density in the geographic area has increased beyond an application download density threshold. The location data determiner 212 may remove a geographic area from the location data, for example, if an application download density in the geographic area has fallen below an application download density threshold. The location data determiner 212 may include a geographic area in the location data based on a rate of change in application downloads in the geographic area. The location data determiner 212 may include a geographic area in the location data, for example, if a rate of change in application downloads is above a threshold (e.g., application downloads doubling every month).

The location data determiner 212 may update the location data based on a change in application installation data. The location data determiner 212 may include a geographic area in the location data, for example, if an application installation density in the geographic area has increased beyond an application installation density threshold. The location data determiner 212 may remove a geographic area from the location data, for example, if an application installation density in the geographic area has fallen below an application installation density threshold. The location data determiner 212 may include a geographic area in the location data based on a rate of change in application installations in the geographic area. The location data determiner 212 may remove a geographic area from the location data, for example, if a rate of change in application installations is below a threshold (e.g., application installations halved month-over-month).

The location data determiner 212 may update the location data based on a change in application usage data. The location data determiner 212 may not have included a geographic area in the location data, for example, because the application usage in the geographic area was below an application usage threshold (e.g., below 5 minutes per month). The location data determiner 212 may include the geographic area in the location data, for example, if the application usage time increases beyond an application usage threshold (e.g., from 2 minutes per month to 10 minutes per month). The location data determiner 212 may remove a geographic area from the location data, for example, if an application usage time decreases below the application usage threshold (e.g., from 10 minutes per month to 2 minutes per month).

The location data determiner 212 may update the location data based on a change in application uninstallation data. The location data determiner 212 may not have included a geographic area in the location data, for example, because a number of application uninstallations was above an application uninstallations threshold (e.g., above 10,000 uninstallations per quarter). The location data determiner 212 may include the geographic area in the location data, for example, if the number of application uninstallations has decrease below the application uninstallations threshold (e.g., decreased from 50,000 uninstallations per quarter to 5,000 uninstallations per quarter). The location data determiner 212 may remove a geographic area from the location data, for example, if a number of application uninstallations has increased beyond an application uninstallations threshold (e.g., increased from 5,000 uninstallations per quarter to 50,000 uninstallations per quarter).

The location data determiner 212 may update the location data based on a change in application reviews. The location data determiner 212 may determine sentiment based on the application reviews. The location data determiner 212 may update the location data based on a change in sentiment. The location data determiner 212 may determine that the sentiment for an application has changed from negative to positive. The location data determiner 212 may include a geographic area in the location data, for example, when the sentiment in the geographic area shifts towards positive (e.g., from extremely negative to neutral). The location data determiner 212 may remove a geographic area from the location data, for example, when the sentiment in the geographic area shifts towards negative (e.g., from extremely positive to neutral).

The location data determiner 212 may update the location data based on changes in application ratings. The location data determiner 212 may not have included a geographic area in the location data, for example, because the application ratings in the geographic area were below an application rating threshold (e.g., below 2 stars). The location data determiner 212 may include the geographic area in the location data, for example, if the application ratings in the geographic area have increased beyond the application rating threshold (e.g., application ratings have increased from 1 star to 3 stars). The location data determiner 212 may remove a geographic area from the location data, for example, if the application ratings in the geographic area have decrease below the application rating threshold (e.g., application ratings have decreased from 3 stars to 1 star).

The location data determiner 212 may update location data of an application based on application-specific data. The location data determiner 212 may determine that an application has started servicing a geographic area that was not previously serviced. The location data determiner 212 may update the location data to include the geographic area where an application service is now available. For example, the location data determiner 212 may determine that a delivery application has started delivering within a city where deliveries were not previously available. The location data determiner 212 may update the location data for the delivery application to include the city where deliveries are now available. The location data determiner 212 may determine changes in application services or application functions at a geographic location based on application description, application reviews, application ratings, or field testing.

The location data determiner 212 may update the location data for an application based on input from an operator (e.g., a human operator). The operator may manually update the location data. The operator may update the location data based on a change in a number of application installations (e.g., by comparing changed application installation densities with an installation density threshold). The operator may update the location data based on a change in a number of application downloads (e.g., by comparing changed application download densities with a download density threshold). The operator may update the location data based on a change in a number of application uses (e.g., by comparing changed application usage time with a threshold usage time). The operator may update the location data based on a change in a number of application uninstalls (e.g., by comparing changed application uninstallation densities with an uninstallation density threshold). The operator may update the location data based on a change in application-specific data (e.g., application description, application reviews, application ratings, or the like).

The location data determiner 212 may update the location data by modifying a geographic area indicated by the location data. The location data determiner 212 may expand a geographic area associated with an application. The location data determiner 212 may expand the geographic area by increases a size of a perimeter. The location data determiner 212 may expand the geographic area by increasing a radius value of a circular geographic area. A geographic area may include a zip code. The location data determiner 212 may expand the geographic area by including another zip code in the geographic area (e.g., a neighboring zip code). For example, the location data determiner 212 may update the location data of a delivery application by including an additional zip code as the delivery range expands.

The location data determiner 212 may reduce a geographic area associated with an application. The location data determiner 212 may reduce the geographic area by reducing a size of a perimeter. The location data determiner 212 may reduce the geographic area by decreasing a radius value of a circular geographic area. A geographic area may include multiple zip codes. The location data determiner 212 may reduce the geographic area by removing one of the zip codes. For example, the location data determiner 212 may update the location data of a ride-sharing application by removing a zip code where the ride-sharing application may not be permitted to operate.

The application data store 220 stores data related to applications. The application data store 220 may store data related to an application as an application record (e.g., application record 400). An application record may correspond with an application. Each application record may correspond with a different application. The data store 220 may store applications corresponding with the application records. The data store 220 may be associated with a digital distribution platform. For example, the data store 220 may provide applications to user devices via the digital distribution platform. The data store 220 may include one or more databases, indices (e.g., inverted indices), tables, Look-Up Tables (LUT), files, or other data structures.

The search results determiner 230 determines search results based on a search query (e.g., search query 162). The search results determiner 210 may receive the search query, for example, from a user device (e.g., user device 140), a partner computing system, or the like. The search results determiner 230 may receive a query wrapper (e.g., query wrapper 160) that may include the search query. The search results determiner 230 performs a search for application records based on data included in the query wrapper. For example, the search results determiner 230 may search for application records 400 stored in the data store 220 based on the search query and a search location. The search results determiner 230 may include information from application records in the search results (e.g., search results 170). For example, the search results determiner 230 may include application download addresses for applications in the search results. The search results determiner 230 may transmit the search results to the user device. The search system 200 may cause the search results to be displayed on a display of the user device.

The search results determiner 230 may include a search location determiner 232. The search location determiner 232 may determine the search location. The search location determiner 232 may determine the search location by identifying a location included in the query wrapper. For example, the search location determiner 232 may determine the search location by identifying a location specified in the search query (e.g., query-specified location). The search location determiner 232 may identify a query-specified location by comparing search terms in the search query with known locations. Known locations may be stored in a location data store (not shown). The search location determiner 232 may identify the query-specified location upon matching one or more search terms with a known location.

The search location determiner 232 may determine the search location by determining a geographic location (e.g., geo-location) of the user device. The geographic location of the user device may be referred to as a user device location. The search location determiner 232 may determine the user device location by identifying the geo-location in the query wrapper (e.g., data 164 may include user device location). The search location determiner 232 may determine the user device location based on information included in the query wrapper (e.g. based on data 164). For example, the query wrapper may include an IP address. The search location determiner 232 may determine the search location by determining a location that corresponds with the IP address. For example, the search location determiner 232 may use an IP address lookup service to determine a location corresponding with an IP address.

The search location determiner 232 may determine the search location based on data included in the query wrapper. For example, the query wrapper may include a user device ID. The search location determiner 232 may determine the search location by determining a location that corresponds with the user device ID. A user may have associated a location with the user ID and the search location determiner 232 may identify the location upon receiving the user ID. For example, the search location determiner 232 may retrieve the location corresponding with the user device ID by using a Look-Up Table (LUT). The query wrapper may include a Wi-Fi network ID for a Wi-Fi network that the user device detects or that the user device may be connected to. The search location determiner 232 may determine the search location by determining a location of the Wi-Fi network with the Wi-Fi network ID specified in the query wrapper. The search location determiner 232 may use a Wi-Fi network look-up service to determine a location of the Wi-Fi network.

The search location determiner 232 may determine the search location based on platform data included in the query wrapper. The query wrapper may include platform data associated with the user device (e.g., Operating System (OS) name, OS version, or installed application names). The search location determiner 232 may determine the search location by determining a location of user devices that include the platform data included in the query wrapper. For example, the search location determiner 232 may query a digital distribution platform for user devices with the platform data specified in the query wrapper. The search location may be a geographic point, for example, a Global Positioning System (GPS) location (e.g., longitude and latitude). The search location may be an address (e.g., a postal address, or a street address). The search location may be a city block, a zip code, or a school district. The search location may be a village, a town, a city, a county, a state, or a province. The search location may be a country, or a continent. The search location may be a time zone.

The search results determiner 230 searches for application records (e.g., application records 400) stored in the data store 220. The search results determiner 230 may search for application records in the data store 220 after determining the search location. The search results determiner 230 may search for application records based on the search query and the search location. The search results determiner 230 may generate scores (e.g., relevance scores or result scores) for application records identified during the search. The score for an application record may indicate the relevance of the corresponding application to the search query. A higher score may indicate that the application record is more relevant to the search query. The search results determiner 230 may retrieve application download addresses from application records. For example, the search results determiner 230 may retrieve application download addresses from the highest scoring application record(s).

The search system 200 may include information from the application records in the search results. For example, the search results may include information from the highest scoring application records (e.g., from 1, 2 or 3 of the highest scoring application records). The search results may include application names, application icons, application download addresses, prices, ratings, reviews, scores and/or the like. The search system 200 may indicate the scores (e.g., search result ranks) of different applications in the search results by determining a display order of the application names. For example, the search system 200 may display application names with higher scores towards the top of the search results and application names with lower scores towards the bottom of the search results. The search system 200 may display the search results as user-selectable links. Upon receiving a selection of a user-selectable link, the search system 200 may install an application corresponding with the user-selectable link. The search system 200 may launch the application corresponding with the user-selectable link.

Figure 3:
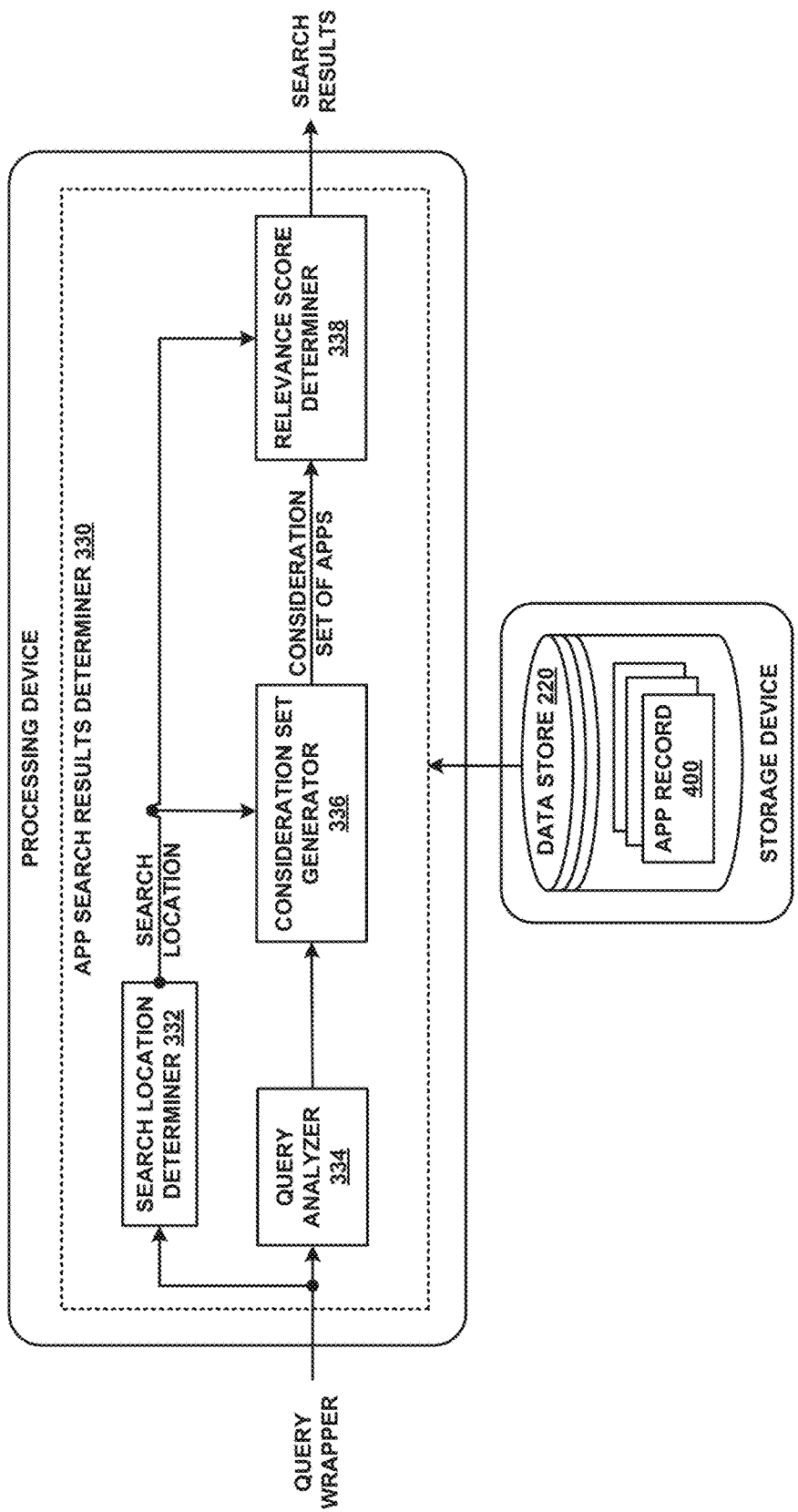
FIG. 3 illustrates a block diagram of an example application search results determiner.

FIG. 3 shows an example search results determiner 330. The search results determiner 330 may be implemented by a processing device (e.g., processing device 202). The search results determiner 330 may implement the search results determiner 230. The search results determiner 330 receives a query wrapper and determines search results based on a search query in the query wrapper. The search results determiner 330 may include a search location determiner 332, a query analyzer 334, a consideration set generator 336, and a relevance score determiner 338. The search location determiner 232 may implement the search location determiner 332. The query analyzer 334 analyzes the query wrapper. The consideration set generator 336 identifies a set of applications (e.g., application records 400) based on the received query wrapper. The identified set of applications may be referred to as a consideration set. The relevance score determiner 338 may determine a relevance score for applications in the consideration set. The relevance score determiner 338 may score (e.g., rank and/or order) the consideration set to generate a set of search results. The search results that may include a list of applications along with corresponding result scores indicating the relative rank of each application in the list.

The query analyzer 334 analyzes query wrappers and search queries in query wrappers. The query analyzer 334 may receive a query wrapper (e.g., query wrapper 160). The query analyzer 334 may tokenize search terms in a search query, for example, by identifying parsed tokens. The query analyzer 334 may perform stemming, for example, by reducing words in the search query to their stem word or root word. The query analyzer 334 may perform synonymization, for example, by identifying synonyms of search terms in the search query. The query analyzer may perform stop word removal, for example, by removing commonly occurring words from the search query (e.g., by removing "the", "a", or the like).

The consideration set generator 336 identifies application records (e.g., consideration set) based on the received search query. The consideration set generator 336 may identify the consideration set based on matches between search terms of the search query and terms in the application records. The consideration set generator 336 may include an application record in the consideration set, for example, if one or more search terms in the search query match the application attributes of the application record. The consideration set generator 336 may receive tokens from the query analyzer 334. The consideration set generator 336 may identify the consideration set based on matches between the tokens and words included in the application records. For example, the consideration set generator 336 may include an application record in the consideration set, if one or more tokens match word(s) in an application name field, an application ID field, an application description field, or an application attributes field of the application record.

The consideration set generator 336 may generate the consideration set based on the search location. The consideration set generator 336 may receive the search location from the search location determiner 332. The consideration set generator 336 may filter application records based on the search location. For example, the consideration set generator 336 may include an application record in the consideration set, if the location data of the application record includes the search location. The consideration set generator 336 may include an application record in the consideration set, for example, if the search terms match words in the application record and the location data of the application record indicates a geographic area that includes the search location. The consideration set generator 336 may exclude an application record from the consideration set, for example, if the search location is outside the geographic area defined by the location data. The consideration set may include application records that may be geographically relevant to the user.

The relevance score determiner 338 may score (e.g., rank) application records in the consideration set. The relevance score determiner 338 may generate the search results (e.g., search results 170). The scores associated with the application records may be referred to as relevance scores, result scores, or ranks. The relevance score determiner 338 may determine a score for application records (e.g., each application record) in the consideration set. The score associated with an application record may indicate the relative rank of the application record among other application records. For example, a larger result score may indicate that an application record is more relevant to the received search query. The search results may include application download addresses (e.g., links) from application records (e.g., all application records) in the consideration set. The search results may include a subset of the consideration set. For example, the subset may include links from application records with the highest scores (e.g., 1, 2 or 3 of the highest scoring application records).

The score of an application record may indicate a qualitative property or a quantitative property of an application represented by the application record. For example, the score of an application record may indicate a relevance of an application record to the search query. The score of an application record may indicate a popularity of an application represented by the application record. The score of an application record may indicate a quality of an application represented by the application record. The score of an application record may indicate a relevance of the application record to the search location.

The relevance score determiner 338 may score application records based on one or more scoring features. The scoring features may be associated with the application record and/or the search query. Example scoring features may include an application record scoring feature ("record scoring feature", hereinafter), a query scoring feature, and/or a record-query scoring feature.

A record scoring feature may be associated with an application record. A record scoring feature may include data associated with an application. For example, a record scoring feature may include application attributes from the application record. A record scoring feature may include parameters related to the application. A record scoring feature may include data that indicates a popularity of an application. For example, a record scoring feature may indicate a number of application downloads. A record scoring feature may indicate a rating of an application (e.g., number of stars associated with the application). A record scoring feature may include a Boolean value that indicates whether there is any location data associated with an application record.

A query scoring feature may be associated with a search query. A query scoring feature may include data associated with the search query. Example query scoring features may include a number of words in the search query, a popularity of the search query, and/or an expected frequency of the words in the search query. A record-query scoring feature may include data that may be generated based on data associated with an application record in the consideration set and a search query. A record-query scoring feature may include parameters that indicate a number of matches between the terms of the search query and the application record in the consideration set. A record-query scoring feature may include a Boolean value that indicates whether the search location is within the geographical area associated with an application record. A record-query feature may include a distance from a first center of a first geographical area, indicated by the search location, to a second center of a second geographical area indicated by the location data of an application record.

The relevance score determiner 338 may score an application record based the record scoring feature(s), the query scoring feature(s), and/or the record-query scoring feature(s). The relevance score determiner 338 may include machine learned model(s) (e.g., a supervised learning model). The machine learned model may be configured to receive the scoring features. The machine learned model may score application records based on record scoring features, query scoring features, and/or record-query scoring features.

The relevance score determiner 338 may determine a feature vector for an application record. For example, the relevance score determiner 338 may calculate a feature vector for each application record. The relevance score determiner 338 may determine the feature vector for an application record based on information included in the application record and the search query. The feature vector may include record scoring features, query scoring features, and/or record-query scoring features. The relevance score determiner 338 may use the feature vector as an input for a machine-learned regression model to calculate a score for the application record. The machine-learned regression model may include a set of decision trees (e.g., gradient boosted decision trees). The machine-learned regression model may include a logistic probability formula. A machine learned task can be implemented as a semi-supervised learning task, where a portion of the training data is labeled with human-curated scores and the remaining training data may be used without human-curated scores.

The relevance score determiner 338 may rank application records based on scores associated with the application records. Ranking application records may refer to ranking applications represented by the application records. Ranking application records may refer to ranking application download addresses from the application records. A user device may rank the application records, for example, after receiving application download addresses and scores associated with the application download addresses. The relevance score determiner 338 may rank the application records. An application record may be more relevant than another application record, for example, if the application record has a higher score than the other application record.

The relevance score determiner 338 may transmit the search results to the user device. The relevance score determiner 338 may transmit the search results via a communication device (not shown). The user device may display the search results as a list. The list may include multiple list entries, each list entry may correspond with a different application. A list entry may identify an application by displaying an application identifier (e.g., an application name, or an application icon). The list entry may indicate a price associated with the application. The list entry may include an application icon, an application screenshot, an application rating, a portion of an application description and/or a video associated with the application. The list entry may include a link associated with the application. The link may be an application download address, for example, to download and/or install the application. The link may launch the application, for example, if the application is already installed. The user device may display the search results in other formats, for example, as tiles, as icons, as a grid, or the like.

A user device may indicate ranks or scores for applications. The user device may indicate ranks or score for applications by displaying application identifiers for higher scoring applications near the top of a list of search results (e.g., near the top of a display screen). The user device may display application identifiers for lower scoring applications farther down the list (e.g., towards the bottom of the display screen, or off-screen). The user device may display an application identifier by displaying an application name, an application icon, a price and/or an application download address.

The relevance score determiner 338 may score application records based on where the search location is located relative to the geographic area indicated by the location data of the application record. The relevance score determiner 338 may assign a greater score to an application record when the search location is within a threshold distance from a center of a geographic area or a perimeter indicated by the location data. The relevance score determiner 338 may assign a greater score to an application record when the search location is within a threshold distance from a coordinate indicated by the location data (e.g., within 5 miles). The relevance score determiner 338 may assign a smaller score to an application record when the search location is beyond a threshold distance from the coordinate (e.g., beyond 50 miles). For example, the relevance score determiner 338 may score an application record higher than another application record, if the geographic center indicated by the application record is closer to the search location than the geographic center indicated by the other application record.

The relevance score determiner 338 may score an application record based on a distance between the search location and the geographic area indicated by the application record. The relevance score determiner 338 may generate a distance scoring feature that indicates the distance from the search location to a coordinate indicated by the location data. The distance scoring feature may be a number between 0.0 and 1.0 that indicates the distance of the search location from the coordinate. A 0.0 may correspond to a search location that is located at the center of the geographic area. A 1.0 may correspond to a search location that is located at the perimeter of a geographic area (e.g., the perimeter of a circular geographic area). The relevance score determiner 338 may score an application record with a distance scoring feature of 0.0 higher than another application record with a distance scoring feature of 1.0.

The search results determiner 330 may use the search location to score application records, for example, instead of filtering out application records. The relevance score determiner 338 may score application records in the consideration set based on whether the search location is included in the geographic area indicated by the location data. The relevance score determiner 338 may generate a binary scoring feature. The binary scoring feature may be set to 0, for example, if the search location is outside the geographic area indicated by the application record. The binary scoring feature may be set to 1, for example, if the search location is inside the geographic area indicated by the application record.

The relevance score determiner 338 may use the binary scoring feature to score the application record. The relevance score determiner 338 may score an application record higher when the binary scoring feature for the application record has a value of 1 (e.g., search location is inside the geographic area). The relevance score determiner 338 may score an application record lower when the binary scoring feature for the application record has a value of 0 (e.g., search location is outside the geographic area). The relevance score determiner 338 may score an application record based on a distance between a perimeter indicated by the application record and the search location. For example, an application record with a perimeter near the search location may be scored higher than another application record with a perimeter farther from the search location.

Figure 4C:
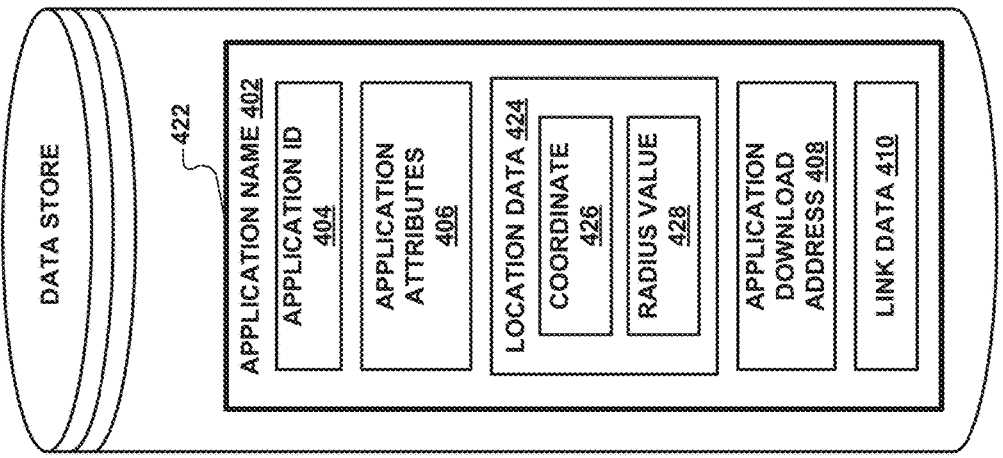
FIGS. 4A-4C illustrate example application records that include location data.
Figure 4B:
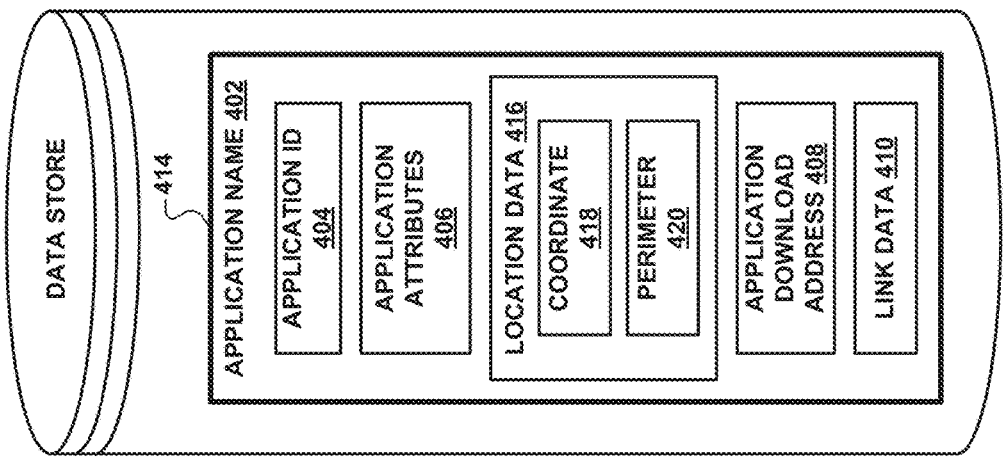
Figure 4A:
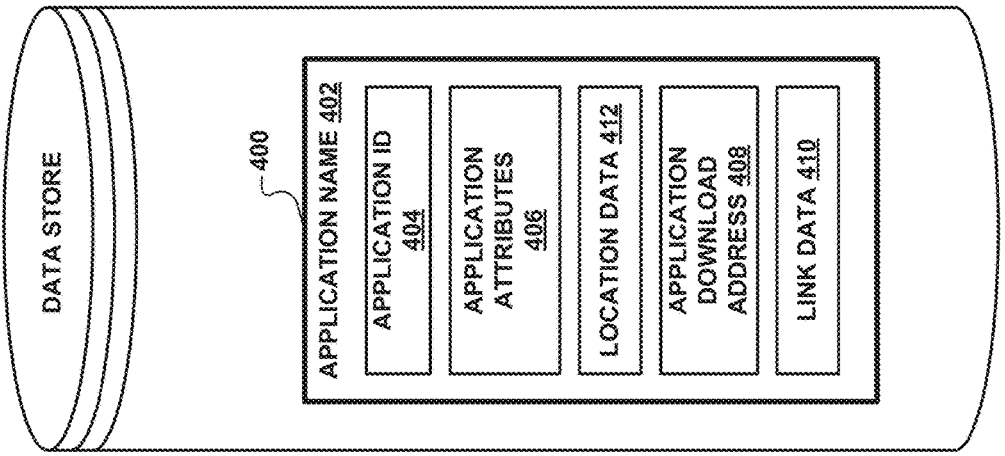

FIG. 4A illustrates an example application record 400. The application record 400 may include an application name 402, an application identifier (ID) 404, application attributes 406, an application download address 408, link data 410, and location data 412. The application record 400 may represent application-related data stored in the data store 220. The data store 220 may include multiple application records that have a similar structure as the application record 400. For example, the data store 220 may include application records that include an application name 402, an application identifier 404, application attributes 406, an application download address 408, link data 410, and location data 412.

The application name 402 may be the name of the application represented by the data in the application record 400. Example application names may include "Google Maps", "Facebook", "Twitter", "Microsoft Word", or "Angry Birds". The application identifier 404 ("application ID 404", hereinafter) identifies the application record 400 among the other application records included in the data store 220. The application ID 404 may uniquely identify the application record 400. The application ID 404 may be a string of alphabetic, numeric, and/or symbolic characters (e.g., punctuation marks) that uniquely identify the application record 400.

The application attributes 406 may include types of data that may be associated with the application represented by the application record 400. The application attributes 406 may include information that is extracted (e.g., crawled or scraped) or inferred from documents retrieved from the data sources 214 (e.g., a website associated with the application). The application attributes 406 may include data that is manually generated. The application attributes 406 may be updated (e.g., periodically, and/or when the application is updated), for example, so that up-to-date results can be provided in response to a search query.

The application attributes 406 may include a name of a developer of the application, a publisher of the application, a category (e.g., genre) of the application, a description of the application (e.g., a developer's description), a version of the application, an operating system for the application, and/or a price of the application. The application attributes 406 may indicate security or privacy data about the application, battery usage of the application, and/or bandwidth usage of the application. For example, the application attributes 406 may indicate the resources the application may use, for example, location, in-app purchases, identity, media files, or the like.

The application attributes 406 may include application statistics. Application statistics may refer to numerical data related to the application. For example, application statistics may include a number of downloads, a download rate (e.g., downloads per month), a number of ratings, an average of user ratings, and/or a number of reviews. The application attributes 406 may include information retrieved from websites such as reviews associated with the application, articles associated with the application (e.g., wiki articles), or other information. The application attributes 406 may include digital media related to the application, such as images (e.g., icons and/or screenshots).

The application attributes 406 may be extracted from documents (e.g., webpages on websites associated with the application). The application attributes 406 may include manually generated data. The application attributes 406 may be updated over time (e.g., periodically), for example, so that up-to-date search results can be provided in response to a search query. The application attributes 406 may be updated when the application is updated (e.g., when a new version is released).

Figure 7:
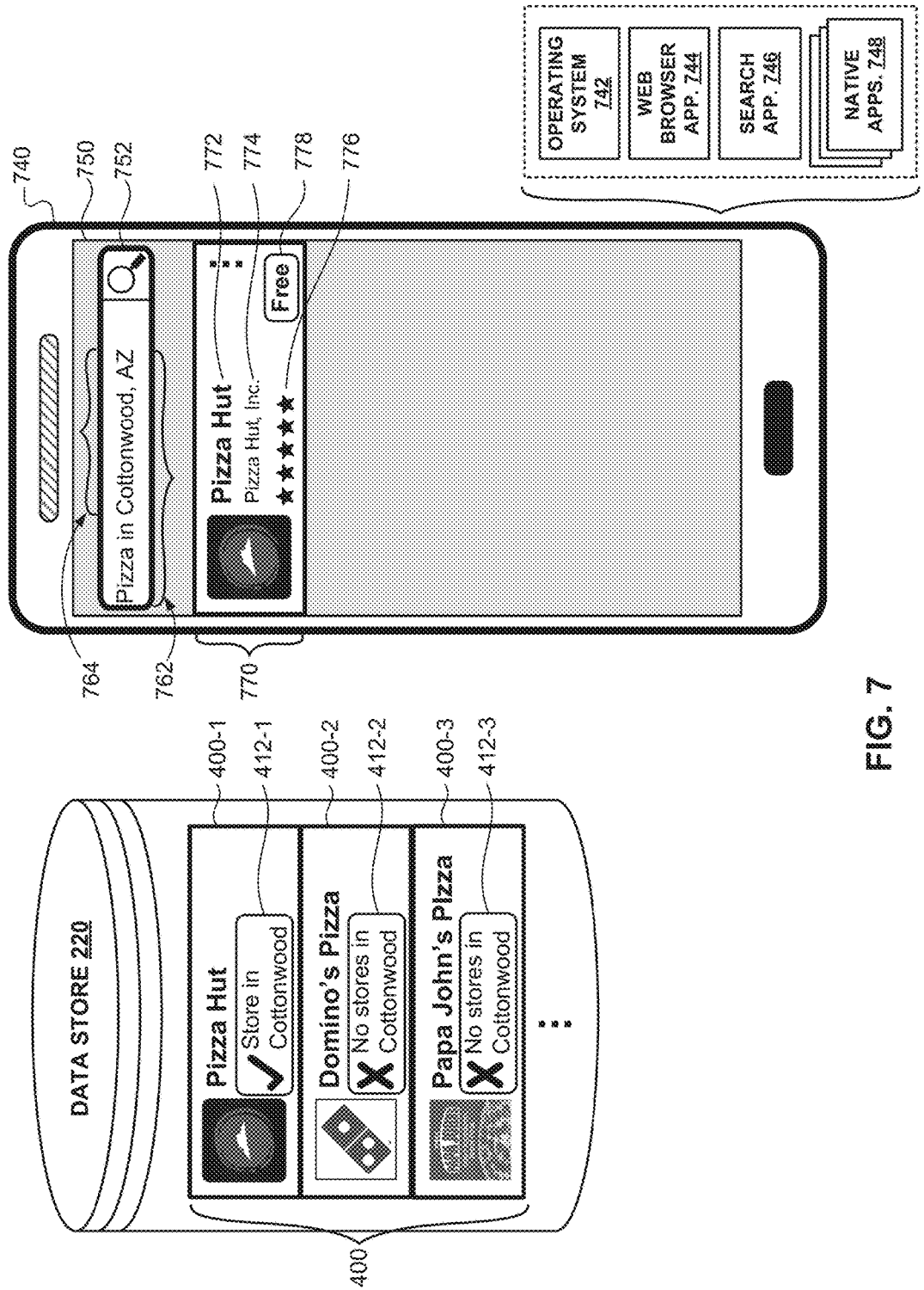
FIG. 7 is a diagram illustrating an example search result screen on a user device.

The application download address 408 may indicate a site(s) where the native applications referenced in the application record 400 can be downloaded and/or previewed. For example, the site may include a website. The site may be a link to a native application, for example, on a digital distribution platform such as the GOOGLE PLAY® store. Link data 410 may include data used by the user device 140 to generate user selectable links (e.g., text and/or images) in a search engine results page (SERP) (e.g., search results screen, for example, as illustrated in FIG. 7).

The application record 400 may include location data 412. The location data 412 may define one or more geographic areas associated with the application. The geographic area may include an area in which the native application may be relevant to the user. Some native applications may provide service in certain areas (e.g., a certain city) and not elsewhere. The location data 412 may identify the areas where the application provides service. For example, a taxi reservation application may provide service in a city where the taxi company operates and not elsewhere. The location data 412 may include data that identifies the city where the taxi company operates. The location data 412 may vary across the application records 400. For example, the location data 412 in the application records 400 may include a particular coordinate, or a geographical region. Some application records 400 may not have location data 412. Such application records 400 may be relevant anywhere, and everywhere in the world. For example, a word processing application (e.g., Microsoft Word) may not include the location data 412.

The location data 412 may be used to present applications that are usable (e.g., operable) in the search location. Some applications may be restricted to a particular location. For example, a media streaming application may be allowed in certain countries and not elsewhere. A gambling application may be restricted to specific areas within the United States and may not be usable outside of the restricted areas. The location data 412 may define geographic areas in which the native application is not restricted (e.g., non-restricted areas).

Some native applications may have a primary usage area, for example, an area of operability, usefulness or interest based on the regions served by the application. A native application associated with a primary usage area may include a local transportation native application (e.g., a NYC Subway app may include a primary usage area of New York City). A native application associated with a primary usage area may include a television network related application such as television scheduling/streaming applications. Native applications for local sporting teams may be associated with a primary usage area where the sports teams play. For example, a high school football team app may be associated with a school district where the high school is located. Native applications for local events, such as a fair or concert, may be associated with an area where the local event is being held (e.g., county, town, city, etc.).

The location data 412 may be used to filter out application records that may not be relevant to a user. For example, some application records 400 may not be included in the search results based on the user's location relative to the geographic area defined by the location data 412. For example, at search time, a search system may filter out application records associated with geographic areas that are located more than a threshold distance (e.g., 5 mi, 10 mi, or 50 mi) from the user. A search system may score and/or rank the search results based on the location data 412 included in the application records. For example, the search system may assign larger result scores to application records associated with geographic areas that are less than a threshold distance from the user (e.g., less than 50 mi).

The location data 412 may define a geographic area associated with the application record 400. For example, the geographic area defined by the location data 412 may be a geographic area that is associated with downloads of the application, installations of the application, app-specific parameters, and/or usage of the application. The geographic area defined by the location data 412 may define a perimeter that surrounds a geographic area associated with the application. The location data 412 may define a geographic area that surrounds Mountain View, Calif., for example, if the application provides information for restaurants in Mountain View, Calif.

The geographic area defined by the location data 412 may include different geometries. For example, the location data 412 may define a geographic area having a circular geometry, a polygon geometry (e.g., a rectangular geometry, a square geometry, a triangular geometry, or a hexagonal geometry), or other shape. The location data 412 may include different information based on the shape of the geographic area. For example, the location data 412 may include geographic coordinates (e.g., latitude and longitude) that indicate the geographic area. The location data 412 may include one or more addresses (e.g., a postal address) that indicate the geographic area.

FIG. 4B shows an example application record 414. Application record 414 includes example location data 416 that includes a coordinate 418 and a perimeter 420. The coordinate 418 and the perimeter 420 may define (e.g., indicate) a geographic area associated with the application. The coordinate 418 may be a geographic coordinate. For example, the coordinate 418 may include a latitude value and a longitude value. The coordinate 418 may include an address (e.g., a postal address), a natural landmark (e.g., Grand Canyon), a man-made landmark (e.g., Great Wall of China), an intersection of streets (e.g., Castro Street & Villa Street in Mountain View, Calif.), or the like.

The perimeter 420 may surround (e.g., enclose) an area of land. For example, the perimeter 420 may surround an area that encompasses the coordinate 418. An area encompassing the coordinate 418 may be bounded by the perimeter 420. The perimeter 420 may have different geometries. For example, the perimeter 420 may have a circular geometer, a polygon geometry (e.g., a square geometry, a rectangular geometry, hexagonal geometry, octagonal geometry, etc.), or other shape. The coordinate 418 may be located at the center of the perimeter 420. For example, the coordinate 418 may be at the center of a circular perimeter 420.

FIG. 4C illustrates an example application record 422. The application record 422 includes location data 424 that indicates (e.g., defines) a geographic area associated with the application. The location data 424 includes a coordinate 426 and a radius value 428. The coordinate 426 and the radius value 428 indicate a circular geographic area associated with the application. The radius value 428 may indicate a circular perimeter that surrounds the coordinate 426. For example, the perimeter around the coordinate 426 may be a circle having a center point at the coordinate 426 and a radius having the radius value 428. The radius value 428 may define the radius length of a circular geographic area associated with the application.

Application records may include location data that indicate non-circular geographic areas. For example, an application record may include location data that defines a polygon region (e.g., rectangular, or square) that may surround a coordinate. An application record may include location data that indicates the polygon perimeter by including values that indicate the length and location of sides of the polygon. An application record may indicate the perimeter by including a length value and a width value that correspond with the length and width, respectively, of a rectangular region surrounding the coordinate. The coordinate may be located at the center of the rectangular region. An application record may indicate the perimeter by including a single value that corresponds with a length of each side of perimeter, for example, when the perimeter includes a square region.

The location data 412 may indicate a size of the geographic area. The size may range from being less than a square mile to being hundreds of square miles. The size of the geographic area may correspond with a size of a village, town, municipality, county, state, or province. For example, the geographic area for a local transportation application may be an area where the local transportation operator provides transportation services to its users. The radius value 428 may indicate the size of the geographic area. The radius value 428 may range from being a fraction of a mile in length (e.g., approximately 0.5 miles) to tens of miles (e.g., approximately 10 miles).

An application record may include location data that indicates a single geographic area (e.g., a single circular area). An application record may include location data that indicates multiple different geographic areas. An application record may include multiple sets of location data that define multiple different geographic areas. For example, the application record may include one set of location data that defines one geographic area and another set of location data that indicates another geographic area. Multiple geographic areas of an application record may have the same shape (e.g., each geographic area may be circular). Multiple geographic areas of an application record may have different shapes (e.g., one geographic area may be circular, another geographic area may be rectangular). Different geographic areas of an application may be separated from each other. Different geographic areas of an application may overlap with each another.

An application record for an application that includes multiple different relevant geographic areas may include location data that indicates multiple different geographic areas. For example, an application record for an application associated with a chain of stores (e.g., restaurants, convenience stores, or gas stations) may include location data that indicates a geographic area for each store location. The separate geographic areas may be located distant from one another. Different geographic areas of an application may not overlap with one another. For example, the geographic areas may be located in different cities, different states of the U.S., or different countries. Different geographic areas of an application may overlap. For example, two geographic areas may include a common zip code.

An application record for an application that offers a service in different geographic areas may include location data that indicates the geographic areas where the application offers service. The location data may indicate different geographic areas corresponding to different cities, for example, if the application offers service in those cities (e.g., only those cities). For example, a delivery service app may offer deliveries in San Francisco and Los Angeles. The location data for the delivery service app may indicate San Francisco as one geographic area and Los Angeles as another geographic area.

Figure 5:
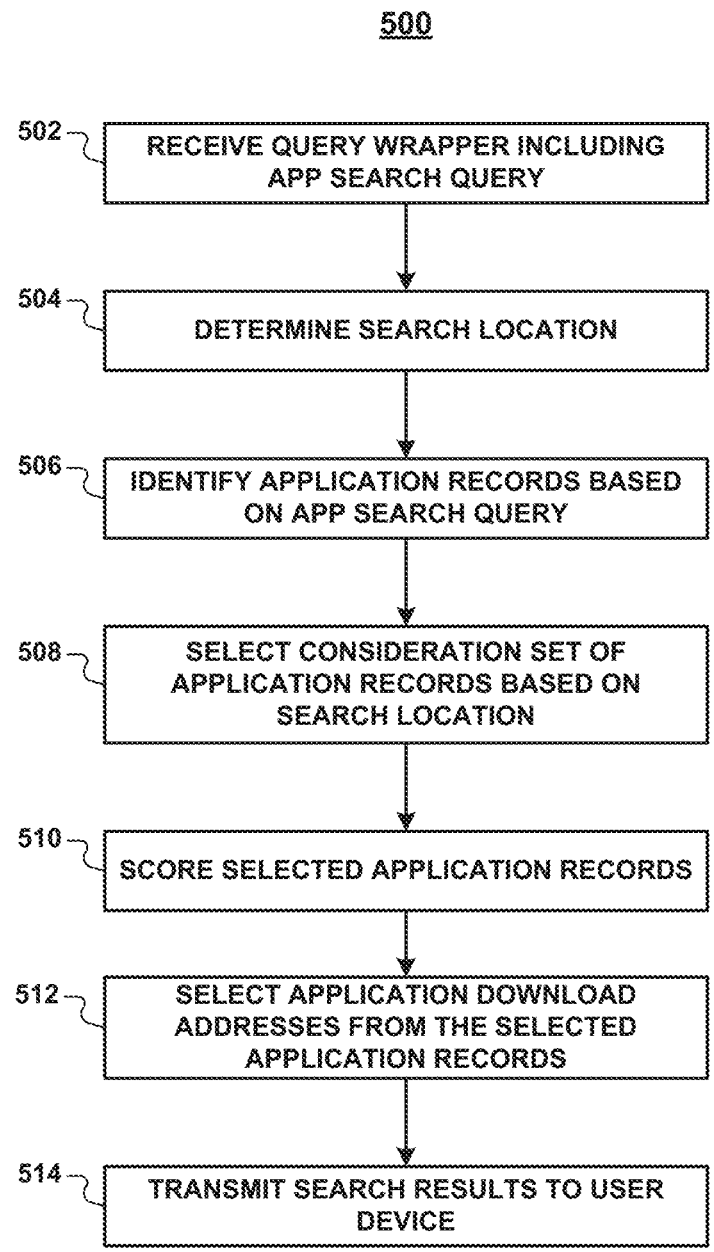
FIG. 5 is a flow diagram that illustrates an example method for performing a location-based search.

FIG. 5 illustrates an example method 500 for performing a location-based application search. The method 500 may be performed by a user device (e.g., user device 140) and/or a search system (e.g., search system 100). At 502, the user device and/or the search system may receive a search query (e.g., search query 162). The search query may be included in a query wrapper (e.g., query wrapper 160).

At 504, the user device and/or the search system may determine a search location (e.g., search location 164). The user device and/or the search system may determine the search location by identifying a query-specified location. The user device and/or the search system may determine the search location by determining a location of the user device. For example, the user device may determine the location of the user device via Global Positioning System (GPS), cellular triangulation, or the like. The user device may determine the location of the user device by identifying a Wireless Local Area Network (WLAN) that the user device is connected with and determining the location of the WLAN (e.g., by using a lookup table).

The search location may include the latitude and longitude of the user device. The search location may include an address associated with the user device (e.g., a postal address, for example, a street address). The search location may refer to a specific location (e.g., an address) or a geographic point (e.g., a latitude and a longitude). The search location may refer to a larger area, for example, an area surrounding the user device (e.g., a city block). The user device may indicate the search location to the search system (e.g., via data 164).

The search system may determine the geographic location (e.g., geo-location) of the user device based on data included in the query wrapper (e.g., based on data 164). The search system may look up the location of the user device using an Internet Protocol (IP) address of the user device. The search system may communicate with a remote server (e.g., a network router) that may provide geo-location data for the user device based on the IP address. The search system may determine the search location based on a user profile associated with the user device. For example, the search system may store a search location associated with the user device. A user of the user device may provide the search location as a setting or a user-preference. The search location may be a location where the user device is frequently present.

At 506, the search system identifies application records based on the search query. For example, the search results determiner 230 may identify application records 400 from the data store 220 based on the search query 162. The search system may identify application records by detecting matches between search terms in the search query and terms included in the application records (e.g., terms in application attributes, or other fields in the application records). Application records identified, at 506, may include location data that the search system may use to score and/or filter the application records.

At 508, the search system may select a set of application records (e.g., consideration set) based on the search location. The search system may select the consideration set by comparing the search location with the location data stored in application records. The search system may include an application record in the consideration set, for example, if the search location is within the geographic area indicated by the location data of the application record. The search system may exclude (e.g., filter out) an application record from the consideration set, for example, if the search location is outside the geographic area indicated by the location data of the application record. The search system may include an application record in the consideration set, for example, if the search location is less than a threshold distance from a perimeter indicated by the location data. The search system may select the consideration set from the application records identified at 506. The search system may select the consideration set from a data store that stores application records (e.g., data store 220). Selecting the consideration set based on the search location may provide search results that are geographically relevant.

At 510, the search system may determine relevance scores ("scores", hereinafter) for application records in the consideration set. For example, the search results determiner 230 may determine a score for each application record in the consideration set. The score for an application record may indicate the relevance of the application record to the search query and/or the search location. The search system may score an application record based on where the search location is located within the geographic area defined by the location data of the application record. For example, the search system may score an application record higher if the search location is located near the center of the geographic area. The search system may score an application record lower, for example, if the search location is located near the perimeter of the geographic area, or outside the geographic area.

The search system may score an application record based on a distance between the search location and the perimeter associated with the application record. The search system may score an application record lower, for example, if a distance between the search location and the perimeter associated with the application record is greater than a threshold. The search system may score an application record higher, for example, if a distance between the search location and the perimeter associated with the application record is less than a threshold. The search system may score an application record based on a size of the perimeter relative to a distance between the perimeter and the search location. For example, the search location may be equidistant from two perimeters corresponding with two different application records. The search system may score the application record with the larger perimeter higher than the application record with the smaller perimeter. The search system may score an application record with a perimeter distant from the search location higher than another application record with a perimeter proximate to the search location, for example, if the distant perimeter is substantially larger than the proximate perimeter.

At 512, the search system may select one or more application download addresses from the selected application records. For example, the search system may select application download addresses (e.g., application download addresses 408) for application records that were scored higher (e.g., top 3 application records).

At 514, the search system may generate and transmit the search results (e.g., search results 170). The search results may identify the selected application records. The search results may include application download addresses for the selected application records. The search results may indicate the scores for the selected application records, for example, by sorting or arranging the application records based on the scores. For example, the application records with the highest score may be presented first in a list of application records. The search results may include link data (e.g., link data 410) for the application records.

The search system may use the search location to score (e.g., rank) the application records, for example, instead of filtering out application records. For example, the consideration set may include all application records identified at 506. The search system may use the search location to rank (e.g., order) the application records. The search system may rank an application record based on the location of the geographic area relative to the search location. For example, the search system may display an application record towards the top of the search results, if the search location is inside the geographic area of the application record. The search system may display an application record towards the bottom of the search results, for example, if the search location is outside the geographic area of the application record.

The search system may arrange a display order of application records based on a distance between the search location and the geographic areas of the application records. The search system may determine distances between the search location and geographic perimeters or coordinates associated with application records. The search system may display the application records in an ascending order of the distances. For example, the search system may display an application record with a geographic area nearest to the search location at the top of the search results. The search system may display an application with a geographic area farthest from the search location at the bottom of the search results. The search system may display an application record having a perimeter proximate to the search location above another application record have a perimeter distant from the search location.

Figure 6:
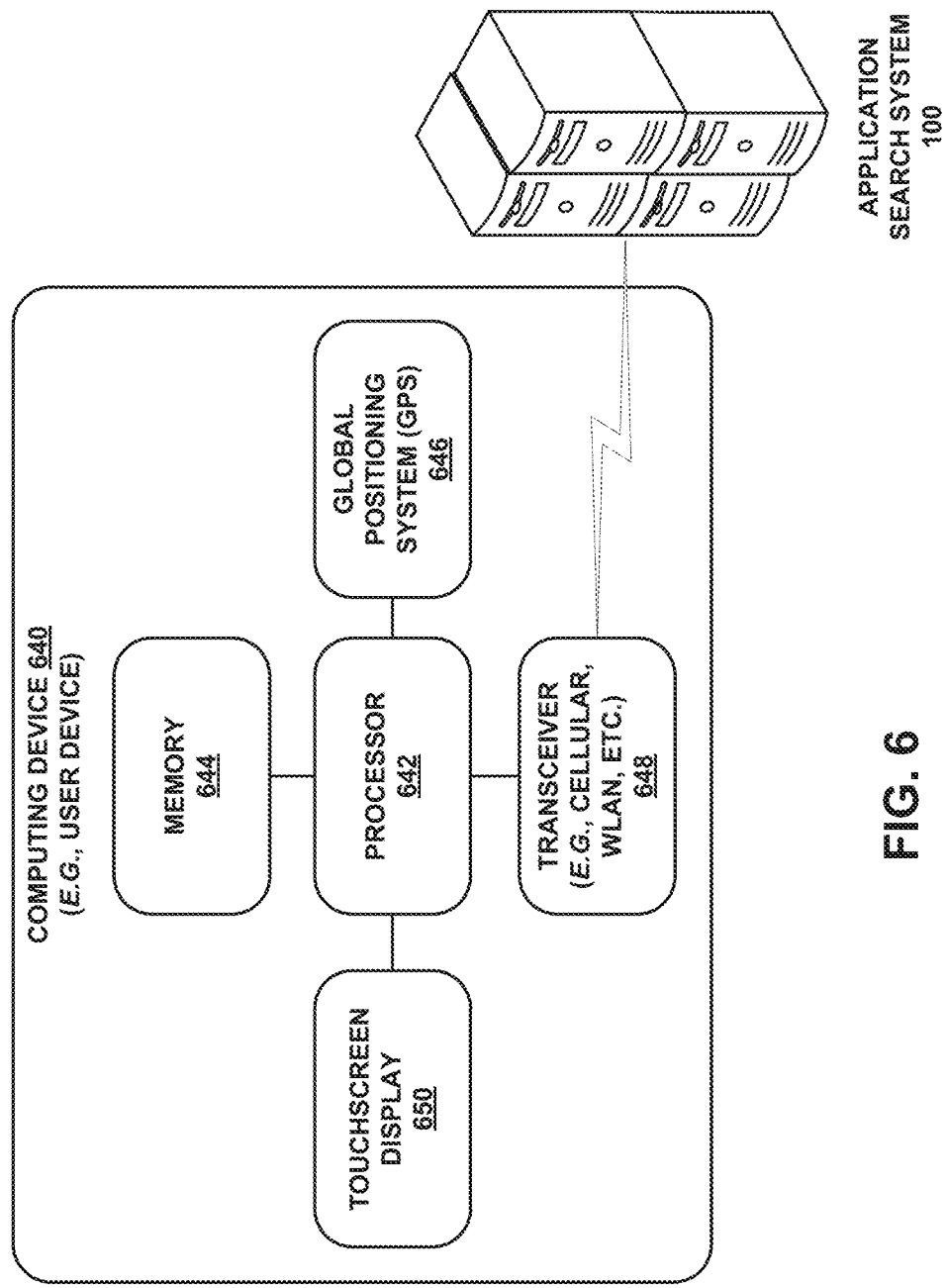
FIG. 6 is a block diagram of an example computing device.

FIG. 6 illustrates an example computing device 640. The computing device 640 may implement a user device (e.g., user device 140). The computing device 640 includes a processor 642 and a non-transitory memory 644. The memory 644 may store instructions that, when executed on the processor 642, configure the processor 642 to receive an application search query and provide search results in response to the search query. The computing device 640 may include a Global Positioning System (GPS) 646. The processor 642 may use the GPS 646 to determine a location of the computing device (e.g., a search location). The computing device 640 may include a transceiver 648. The transceiver 648 may include a cellular transceiver, a Wireless Local Area Network (WLAN) transceiver (e.g., a Wi-Fi transceiver), or the like. The processor 642 may determine a search location via the transceiver 648. The processor 642 may use cellular triangulation to determine the search location. The processor 642 may identify a Wi-Fi network that the transceiver 642 is connected to and identify a location associated with the Wi-Fi network. The processor 642 may receive the search query via a touchscreen display 650 and display search results thereon.

FIG. 7 illustrates an example user device 740 that may receive a search query and display search results. The user device 740 may be implemented by a computing device (e.g., computing device 640). The user device 740 may include an operating system 742, a web browser application 744, a search application 746 and/or native applications 748.

The operating system 742 may manage hardware components, manage software resources and/or provide common services to software applications. Example operating systems may include ANDROID® developed by Google Inc., IOS® developed by Apple Inc., or WINDOWS PHONE® developed by Microsoft Corporation. Example operating systems may include operating systems that may have been modified by manufacturers of user devices, cellular service providers, or e-commerce facilitators. Example operating systems may include MICROSOFT WINDOWS) by Microsoft Corporation, MAC OS® by Apple, Inc., or Linux.

The web browser application 744 may be used to browse, retrieve, traverse and/or display information from the Internet. The search application 746 may be used to perform searches. The search application 746 may be used to perform an application search on a digital distribution platform, the user device 740, or the Internet. The search application 746 may be used to perform general searches (e.g., non-application related searches). For example, the search application may be a general search application that can perform application searches.

Native applications 748 may include applications that have been downloaded and/or installed on the user device 740. Native applications 748 may include pre-loaded applications. For example, native applications 748 may include applications that an operating system developer, a user device manufacturer or a cellular service provider loaded onto the user device 740. Native applications 748 may include applications that a user of the user device 740 downloaded, for example, from a digital distribution platform. Native applications 748 may include a launcher application that may be used to launch other native applications.

The user device 740 may perform application searches via the operating system 742, the web browser application 744, the search application 746 and/or the native applications 748. The user device 740 may display a search box 752 (e.g., search field) on a display (e.g., touchscreen display 750). The search box 752 may be a built-in feature of the operating system 742. The search box 752 may be a part of the web browser application 744. The search box 742 may be a graphical user interface (GUI) component of the search application 746. The search box 742 may be a graphical user interface (GUI) element of one of the native applications 748. For example, a launcher application may display the search box 752 (e.g., on a home screen of the user device).

The search box 752 may receive a search query (e.g., search query 762). The search box 752 may receive the search query via the touchscreen display 750. The search box 752 may receive the search query as voice input via a microphone of the user device 740. The user device 740 may transmit the voice input to a remote server and receive corresponding text. The search box 752 may display the received search query. For example, the search box 752 may display the text corresponding with a voice input.

The user device 740 may determine a search location. The user device 740 may determine the search location by identifying a location in the search query (e.g., search location 764). The user device 740 may transmit the search query to a search system (e.g., search system 200). The user device 740 may transmit the search location to the search system. The user device 740 may receive search results (e.g., search results 770) in response to transmitting the search query. The user device 740 may display the search results 770 on the display 750.

The search system may identify application records that match one or more search terms in the search query. For example, the search system may determine that application records 400-1, 400-2 and 400-3 match the search term "pizza" in the search query. The search system may compare location data of the application records with the search location, for example, to determine whether the application record may be relevant to the search location. The search system may determine that the application record 400-1 (e.g., Pizza Hut application) is relevant to the search location (e.g., Cottonwood, Ariz.), for example, because the location data 412-1 may indicate that there is a Pizza Hut store in Cottonwood. The search system may include the Pizza Hut application in the search results. The search system may determine that the application records 400-2 and 400-3 are not relevant to the search location (e.g., Cottonwood, Ariz.), for example, because the location data 412-2 and 412-3 indicate that there are no Domino's Pizza and Papa John's Pizza stores in Cottonwood, Ariz. The search system may exclude the Domino's Pizza and the Papa John's pizza applications from the search results.

The user device 740 may receive search results from the search system. The user device 740 may display the search results. The user device 740 may display the search results 770 as a list, as tiles, as a grid, or the like. The search results 770 may include a single search result (e.g., search result 770). The user device 740 may display an application name 772 (e.g., application name 402, for example, "Pizza Hut"). The user device 740 may display an application developer name 774 (e.g., application attribute 406, for example, "Pizza Hut, Inc."). The user device 740 may display an application rating 776 (e.g., application attribute 406, for example, number of stars). The user device 740 may indicate an application installation link 778 to install the application (e.g., application download address 408, or link data 410). The application installation link 778 may indicate a price of the application (e.g., "Free"). The user device 740 may receive a user input to install the application. For example, a user may tap the search result 770 or the application installation link 778 to install the application.

Figure 8:
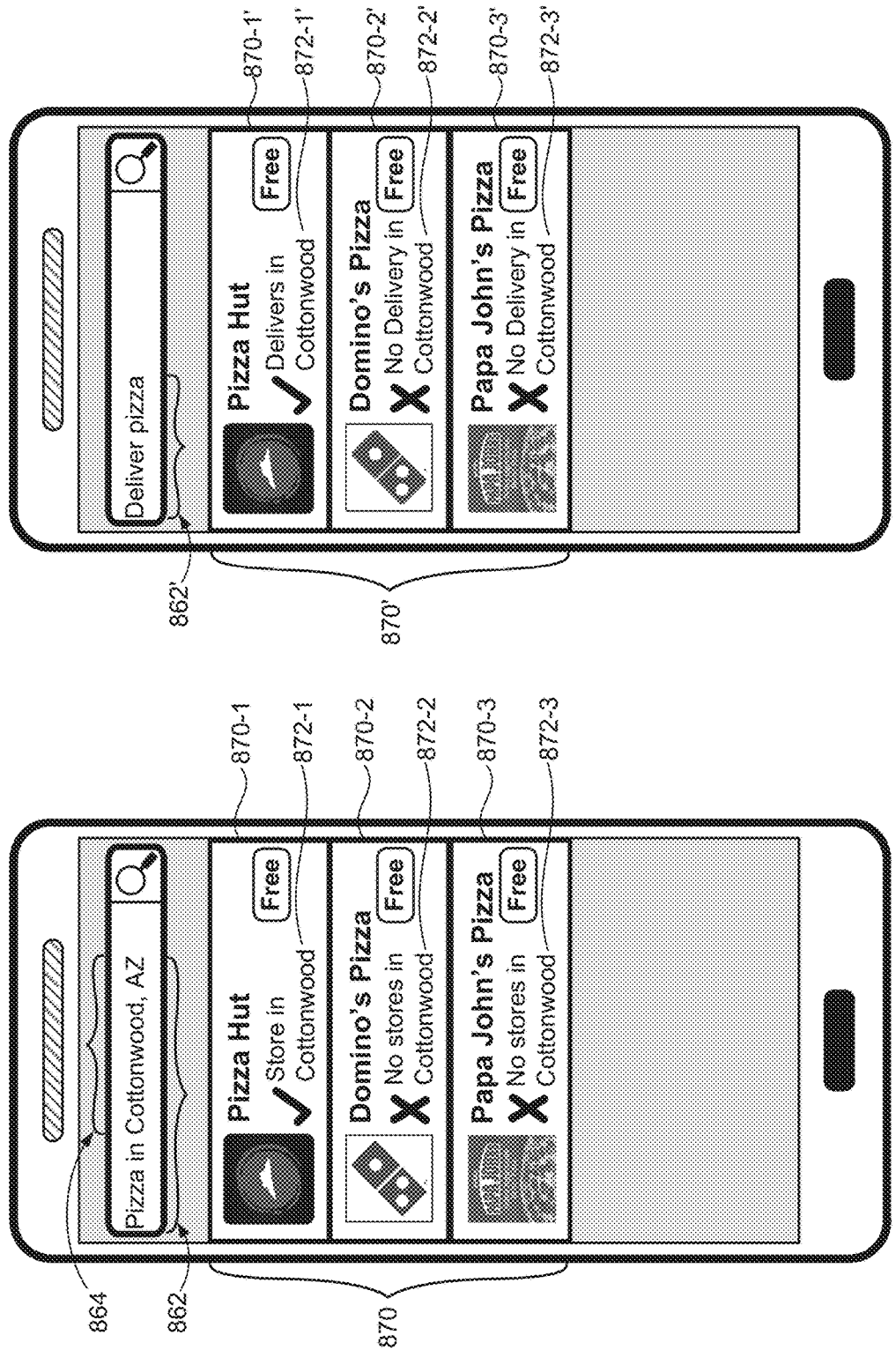
FIGS. 8A and 8B are diagrams illustrating example search results on a user device.

FIGS. 8A-B indicate example search results 870 and 870', respectively. FIG. 8A illustrates an example search query 862 that includes the search location 864. The user device may display search results 870-1, 870-2, and 870-3 in response to receiving the search query 862. The search results 870-1, 870-2, and 870-3 represent applications (e.g., Pizza Hut app, Domino's pizza app, and Papa John's pizza app, respectively) that match one or more search terms in the search query 862 (e.g., the search term "pizza" appears in the application titles). The user device may indicate scores (e.g., ranks) for the search results 870, for example, by displaying the search results 870 in a descending order of relevance. The user device may display the search result 870-1 (e.g., Pizza Hut app) near a top of the display and the search result 870-3 (e.g., Papa John's Pizza app) near a bottom of the display, for example, because the search result 870-1 may have a higher score than the search result 870-2.

The user device may determine the display order of the search results based on the location data associated with the search results. The search results 870-1, 870-2, and 870-3 may be associated with location data 872-1, 872-2, and 872-3, respectively. The location data of a search result may indicate whether the application represented by the search result is relevant in or near the search location. An application may be relevant in the search location, for example, if an application function (e.g., all application functions) may be used at or near the search location. For example, the Pizza Hut app may be relevant in Cottonwood, Ariz. because the location data 872-1 indicates that there is a Pizza Hut in Cottonwood. The user device may display the search results 870-2, and 870-3 instead of filtering them out. The user device may display the less relevant search results 870-2, and 870-3 below the more relevant search result 870-1.

Referring to FIG. 8B, the user device may receive a search query 862' that does not indicate a search location. For example, the search query 862' does not include a query-specified location. The user device may determine the search location, for example, by determining a location of the user device. The user device may display the search results 870'. The user device may display location data 872-1', 872-2', and 872-3' for search results 870-1', 870-2', and 870-3', respectively. The location data may indicate whether a particular function of the application is operable at the search location. For example, location data 872-1' indicates that a delivery function of the application represented by search result 870-1' (e.g., Pizza Hut app) is operable at the search location (e.g., in Cottonwood). The location data 872-2', and 872-3' indicate that delivery functions of applications represented by search results 870-2', and 870-3' (e.g., Domino's Pizza app and Papa John's Pizza app) are not operable at the search location (e.g., Cottonwood).

Figure 9:
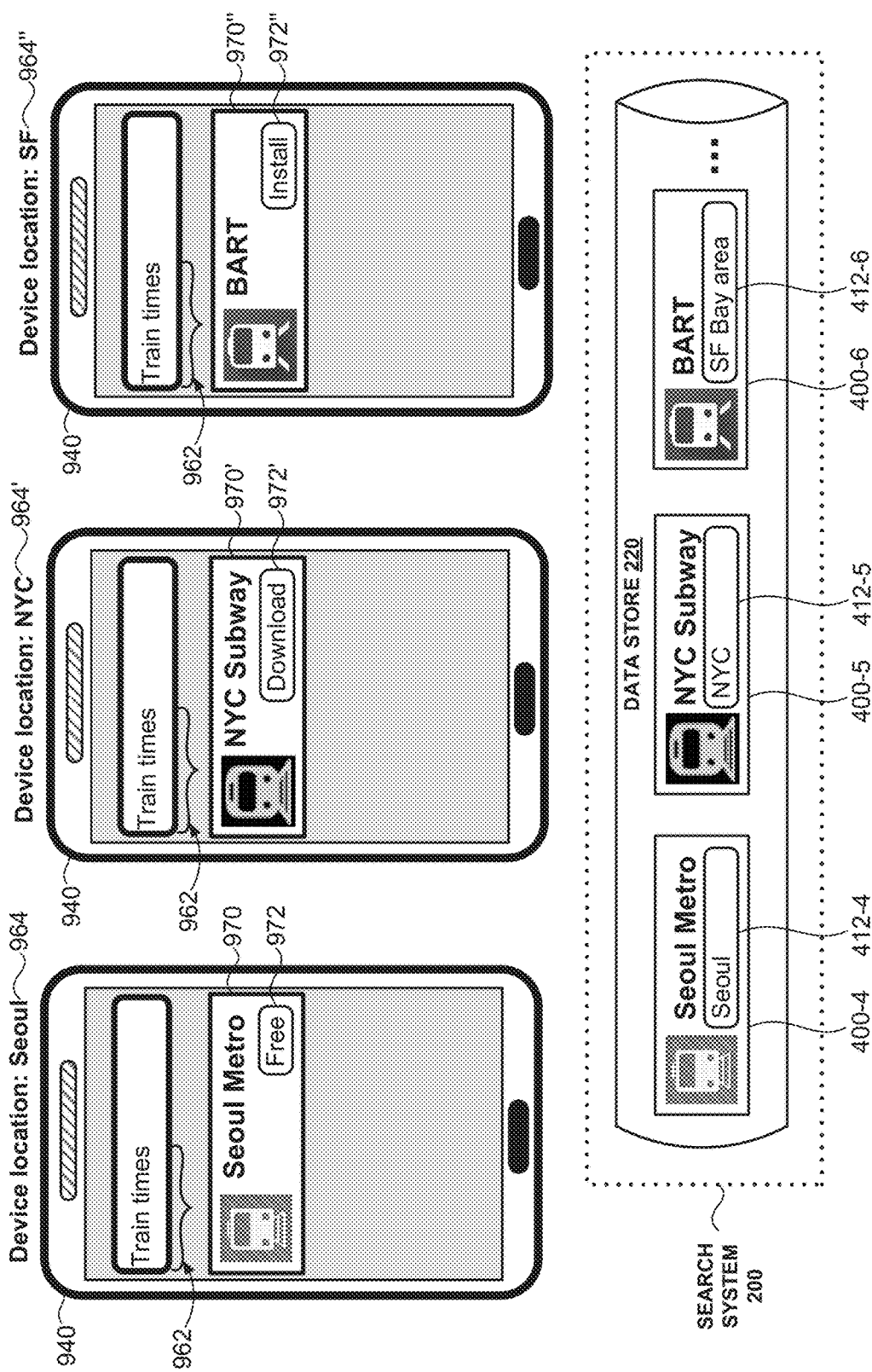
FIG. 9 illustrates screen shots of search results that vary based on device location.

FIG. 9 illustrates an example user device 940. The user device 940 may receive a search query 962 (e.g., "train times"). The search query 962 may not include a search location (e.g., a query-specified location). The user device 940 may use the device location as the search location. The user device 940 may use a device location 964 as the search location, for example, if the user device 940 is located in Seoul. The user device 940 may use a device location 964' as the search location, for example, if the user device 940 is location in New York City. The user device 940 may use a device location 964" as the search location, for example, if the user device 940 is located in San Francisco. The user device 940 may transmit the search query 962 and the search location (e.g., device location 964, 964', or 964") to the search system (e.g., search system 200).

The search system provides location-based application search results based on the search query 962 and the search location (e.g., user device location). The search system may receive the user device location from the user device 940. The search system may determine the user device location, for example, based on an IP address, or the like. The search system may include a data store (e.g., data store 220). The data store may store multiple application records that match the terms of the search query (e.g., application records 400-4, 400-5, and 400-6). Application records 400-4, 400-5, and 400-6 may include location data 412-4, 412-5, and 412-5, respectively. Some application records that match the search terms may not be relevant (e.g., operable, and/or usable) at the user device location. For example, application records 400-5, and 400-6 may not be relevant at the device location 964.

The search system may compare location data of an application record with the device location. The search system may provide the application record as a search result, for example, if the location data of the application record matches the device location. The search system may exclude the application record from the search results when the location data of the application record does not match the device location. The search system provides application record 400-4 as a search result 970 in response to the device location 964, for example, because the location data 412-4 matches the device location 964. The search system may not provide application records 400-5, and 400-6 as search results in response to the device location 964, for example, because the device location 964 does not match the location data 412-5, and 412-6.

The search system may provide application record 400-5 in response to the device location 964', for example, because the device location 964' matches the location data 412-5. The search system may exclude application records 400-4, and 400-6 from the search results in response to the device location 964', for example, because the device location 964' does not match the location data 412-4, and 412-6. The search system may provide application record 400-6 in response to the device location 964", for example, because the device location 964" matches the location data 412-6. The search system may exclude application records 400-4, and 400-5 from the search results in response to the device location 964", for example, because the device location 964" does not match location data 412-4, and 412-5.

The user device 940 may receive and display search results (e.g., search results 970, 970', or 970"). The user device 940 may display a user-selectable application installation button 972, 972', or 972". The user device 940 may display a price (e.g., "Free") on the application installation button 972. The user device 940 may download and install an application upon receiving a selection of the application installation button. Location-based application search may enable the user device 940 to display search results that are relevant to the device location. For example, the user device may display a Seoul Metro app when the user device is in Seoul. The user device may not display the NYC Subway app or the BART app when the user device is in Seoul. The user device may display the NYC Subway app when the user device is in NYC. The user device may not display the Seoul Metro app and the BART app when the user device is in NYC. The user device may display the BART app when the user device is in San Francisco. The user device may not display the Seoul Metro app or the NYC Subway app when the user device is in San Francisco.

Figure 10:
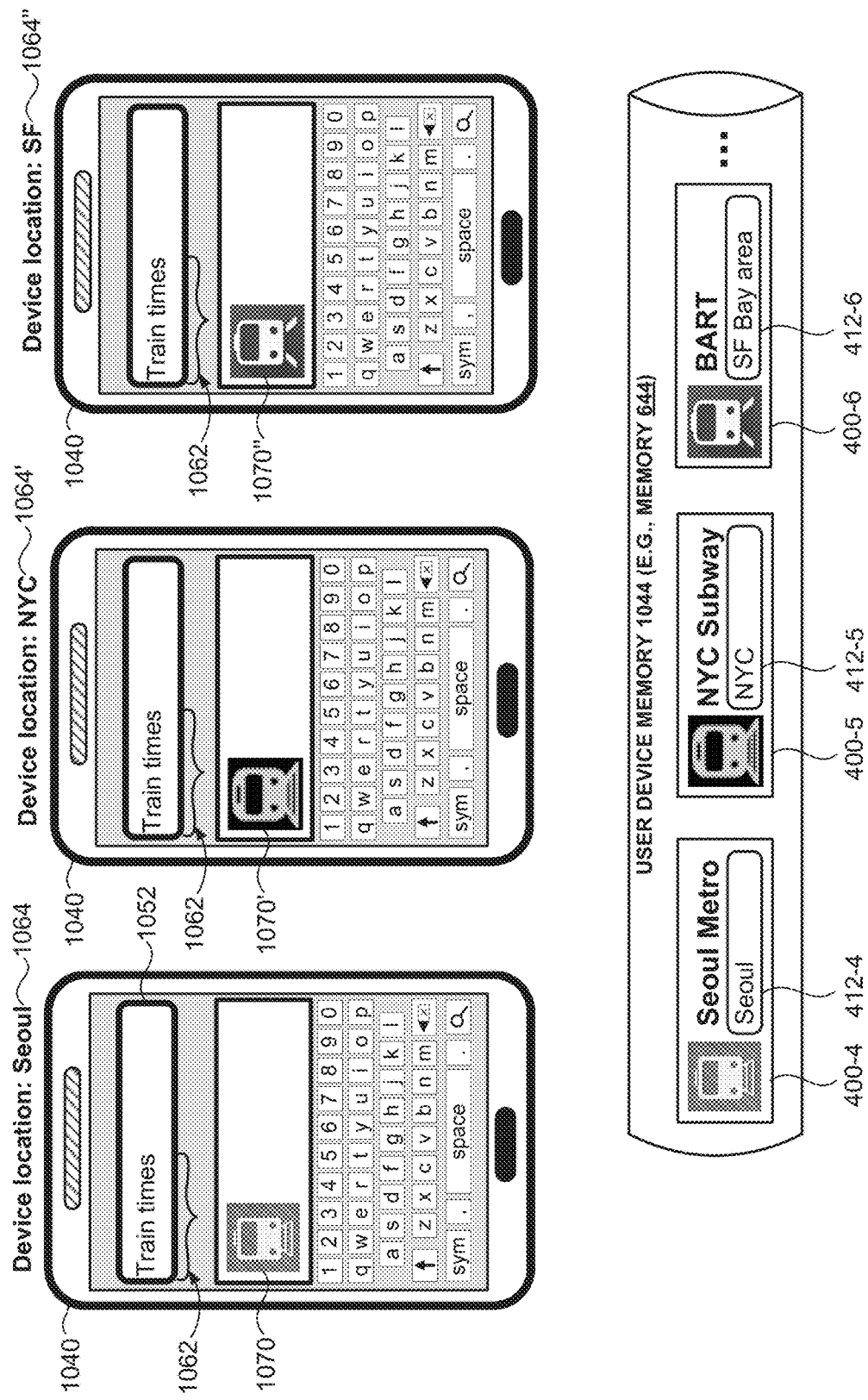
FIG. 10 illustrates screen shots of search results for a local search that vary based on device location.

FIG. 10 illustrates an example user device 1040 that may perform location-based local application search. Local application search may refer to searching for native application that are installed on the user device 1040. The user device 1040 may include multiple native applications. For example, a user of the user device 1040 may have installed multiple native applications on the user device 1040. The user device 1040 may include a memory 1044. The installed applications may be stored in the memory 1044, for example, as application records 400-4, 400-5, and 400-6.

The user device 1040 may display a search box (e.g., search box 1052). The user device 1040 may receive a search query (e.g., search query 1062) via the search box. The user device 1040 may display the search query in the search box. The user device 1040 may identify installed native applications that match the search query. For example, the user device 1040 may identify that the Seoul Metro app, NYC Subway app and the BART app match the search term "train". The user device 1040 may filter applications based on the device location. For example, if the user device 1040 is located in Seoul (e.g., device location 1064), the user device may display the Seoul Metro app (e.g., search result 1070). The user device 1040 may display the NYC Subway app (e.g., search result 1070'), for example, when the user device 1040 is located in NYC (e.g., device location 1064'). The user device 1040 may display the BART app (e.g., search result 1070"), for example, when the user device 1040 is located in San Francisco (e.g., device location 1064").

Figure 11:
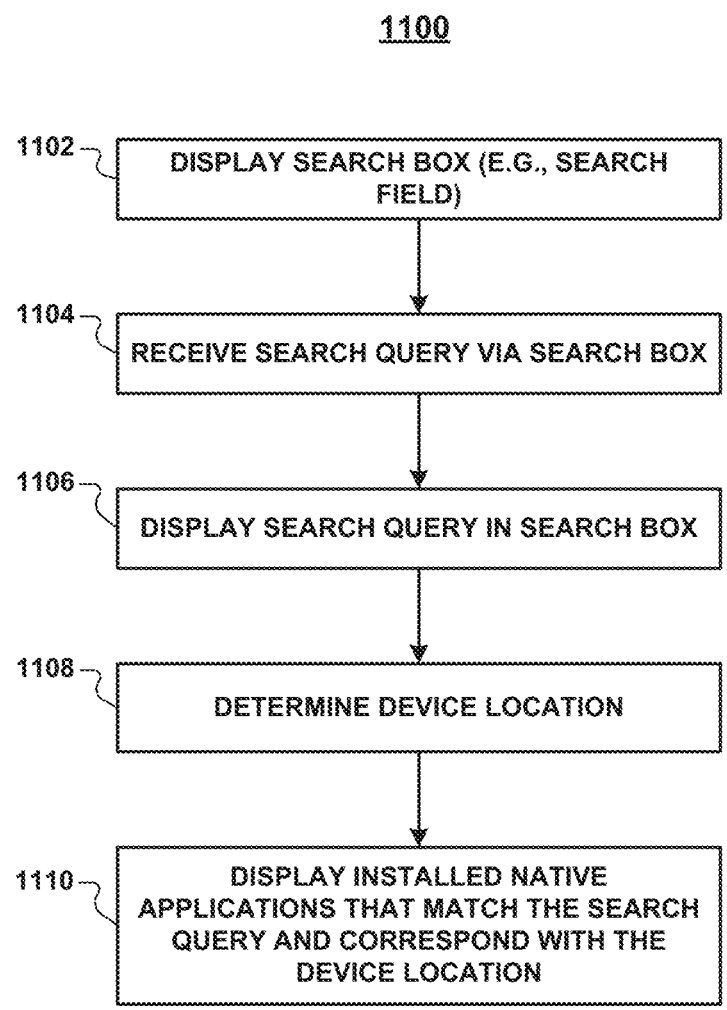
FIG. 11 is a flow diagram that illustrates an example method for performing a location-based search on a user device.

FIG. 11 illustrates an example method 1100 for displaying location based application search results. At 1102, a user device displays a search box. The user device may display the search box on a home screen of the user device. The user device may display the search box within an application (e.g., a browser application, a search application, a launcher application, or the like).

At 1104, the user device receives a search query via the search box. The user device may receive the search query as text input. The user device may receive the search query as voice input. The user device may convert the voice input into text. The user device may transmit the voice input to a remote server and receive corresponding text from the remote server. At 1106, the user device may display the search query in the search box. The user device may enable editing of the search query via the search box.

At 1108, the user device determines a device location of the user device. The user device may determine the device location based on a GPS fix (e.g., via GPS 646). The user device may determine the device location based on cellular triangulation. The user device may determine the device location based on its IP address. The user device may determine the device location by determining the location of the Wi-Fi-network that the user device may detect.

At 1110, the user device displays installed native applications that match the search query and correspond with the current device location. The user device may perform a local application search, for example, by comparing the device location with location data of installed native applications. The user device may display installed native applications that match the search query and the device location as a list, as icons, or the like.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A server computing system for searching applications, the server computing system comprising:
   a network communication device;
   a storage device storing an application data store that stores application records, each application record corresponding with an application, each application record comprising:
      an application title of the application,
      an application description of the application,
      an application download address of the application, and
      location data indicating a geographic area in which the application is available; and
   a processing device in electronic communication with the network communication device, and the storage device, the processing device being configured to:
      receive an application search query from a client computing device via the network communication device, the application search query comprising one or more search terms;
      identify a first application record and a second application record stored in the application data store by comparing the one or more search terms in the application search query with the application titles and the application descriptions of the application records stored in the application data store;
      determine a search location associated with the application search query, the search location comprising one or more of a location specified in the application search query or a location of the client computing device;
      compute a first distance scoring feature based on a distance between the search location and a first geographic area indicated by first location data of the first application record;
      determine a first score for the first application record based on the first distance scoring feature computed for the first application record;
      compute a second distance scoring feature based on a distance between the search location and a second geographic area indicated by second location data of the second application record;
      determine a second score for the second application record based on the second distance scoring feature computed for the second application record;
      select application download addresses from the application records based on the first score and the second score; and
      transmit the selected application download addresses to the client computing device via the network communication device,
         wherein the processing device is further configured to determine location data for at least one of the application records by:
            determining an application usage time within the geographic area, the application usage time representing an amount of time that other client computing devices in the geographic area spend using the application;
            comparing the application usage time with an application usage time threshold; and
            including the geographic area in the location data in response to the application usage time being greater than the application usage time threshold.

2. The server computing system of claim 1, wherein the processing device is further configured to determine the search location by identifying a location specified in the one or more search terms of the application search query.

3. The server computing system of claim 1, wherein the processing device is further configured to determine the search location by identifying a location of the client computing device based on one or more of an Internet Protocol (IP) address of the client computing device, a location of a Wireless Local Area Network (WLAN) that the client computing device is using, or a location associated with a client computing device identifier (ID).

4. The server computing system of claim 1, wherein the processing device is further configured to determine the first location data and the second location data from the application records based on locations of other client computing devices that have downloaded the application.

5. The server computing system of claim 4, wherein the processing device is further configured to:
   determine an application download density in the geographic area;
   compare the application download density in the geographic area with an application download density threshold; and
   include the geographic area in the location data in response to the application download density in the geographic area exceeding the application download density threshold.

6. The server computing system of claim 1, wherein the processing device is further configured to remove the geographic area from the location data based on other client computing devices, located within the geographic area, uninstalling the application.

7. The server computing system of claim 1, wherein the processing device is further configured to determine location data for at least one of the application records by:
   determining an application rating of the application within the geographic area;
   comparing the application rating with an application rating threshold; and
   including the geographic area in the location data in response to the application rating being greater than the application rating threshold.

8. The server computing system of claim 1, wherein the processing device is further configured to:
   compute a binary scoring feature, the binary scoring feature being set to one when the search location is inside the first geographic area of the first application record, the binary scoring feature being set to zero when the search location is outside the first geographic area of the first application record; and
   determine the first score for the first application record based on the value of the binary scoring feature.

9. The server computing system of claim 1, wherein the location data indicates the geographic area by including one or more of a coordinate indicating a center of the geographic area, a perimeter enclosing the geographic area, a zip code, a city name, a state name, a time zone, or a telephone area code.

10. The server computing system of claim 1, wherein the geographic area is determined to be relevant to use of the application based on whether a particular function of the application is operational at a location corresponding to the location data.

11. The server computing system of claim 1, wherein the geographic area is determined to be relevant to use of the application based on whether a function of the application is usable at a location corresponding to the location data.

12. The server computing system of claim 1, wherein the geographic area is determined to be relevant to use of the application based on whether a majority of application functions are operable at a location corresponding to the location data.

13. The server computing system of claim 1, wherein the geographic area is determined to be relevant to use of the application based on whether an application service is available at a location corresponding to the location data.

14. A method for searching applications at a server computing system, the method comprising:
   storing, at a storage device of the server computing system, an application data store that stores application records, each application record corresponding with an application, each application record comprising:
      an application title of the application,
      an application description of the application,
      an application download address of the application, and
      location data indicating a geographic area in which the application is available;
   receiving, by a processing device of the server computing system, an application search query from a client computing device via a network communication device of the server computing system, the application search query comprising one or more search terms;
   identifying, by the processing device, a first application record and a second application record stored in the application data store by comparing the one or more search terms in the application search query with the application titles and the application descriptions of the application records stored in the application data store;
   determining, by the processing device, a search location associated with the application search query, the search location comprising one or more of a location specified in the search query or a location of the client computing device;
   determining, by the processing device, a first score and a second score for the first application record and the second application record based on a positioning of the search location relative to a first geographic area indicated by first location data of the first application record and a second geographic area indicated by second location data of the second application record;
   selecting, by the processing device, application download addresses from the application records based on the first score and the second score;
   transmitting, by the processing device, the selected application download addresses to the client computing device via the network communication device;
   determining, by the processing device, an application usage time within the geographic area, the application usage time representing an amount of time that other client computing devices in the geographic area spend using the application;
   comparing, by the processing device, the application usage time with an application usage time threshold; and
   including, by the processing device, the geographic area in the location data in response to the application usage time being greater than the application usage time threshold.

15. The method of claim 14, wherein the determining of the first score and the second score comprises:
   determining, by the processing device, whether the search location is positioned inside the first geographic area indicated by the first location data of the first application record;

selecting, by the processing device, the first score for the first application record in response to the search location being positioned inside the first geographic area of the first application record; and selecting, by the processing device, the second score for the second application record in response to the search location being positioned outside the second geographic area of the second application record, the second score being less than the first score.

16. The method of claim 14, wherein the determining of the first score comprises:

determining, by the processing device, a first distance of the search location from a center of the first geographic area associated with the first application record; and determining the first score for the first application record based on the first distance of the search location from the center of the first geographic area of the first application record.

17. The method of claim 14, wherein the identifying of the first application record comprises:

determining, by the processing device, whether the search location is inside the first geographic area indicated by the first location data of the first application record;

including, by the processing device, the first application record in a consideration set of applications in response to the search location being inside the first geographic area indicated by the first location data of the first application record; and filtering out, by the processing device, the first application record from the consideration set of applications in response to the search location being outside the first geographic area indicated by the first location data of the first application record.

18. The method of claim 14, further comprising generating location data for at least one of the application records by:

determining an application installation density of the application in the geographic area;

comparing the application installation density of the application in the geographic area with an application installation density threshold; and indicating the geographic area in the location data by including a perimeter surrounding the geographic area in the location data in response to the application installation density being greater than the application installation density threshold.

19. A mobile computing device comprising:

a touchscreen display;

a microphone;

a transceiver;

a non-transitory memory storing a plurality of application records, each application record comprising an application identifier, an application title, an application icon, and location data indicating a geographic area associated with an application corresponding with the application record; and a computing processor in electronic communication with the touchscreen display, the microphone, the transceiver, and the non-transitory memory, the computing processor being configured to:

display a search box on the touchscreen display, receive an application search query via one of the touchscreen display and the microphone, the application search query comprising one or more search terms, display the application search query in the search box, determine a search location associated with the application search query, the search location comprising one or more of a location specified in the application search query or a location of the computing device, generate a consideration set of application records by, for at least two application records in the plurality of application records:

comparing the one or more search terms in the application search query with the application titles stored in the at least two application records, obtain a first application record and a second application record from the consideration set of application records in response to the one or more search terms matching the application titles, compute a first distance scoring feature based on a first distance between the search location and a first geographic area indicated by first location data in the first application record, determine a first score for the first application record based on the first distance scoring feature computed for the first application record, compute a second distance scoring feature based on a distance between the search location and a second geographic area indicated by second location data of the second application record, determine a second score for the second application record based on the second distance scoring feature computed for the second application record, select application identifiers from the application records based on the first score and the second score, display the selected application identifiers on the touchscreen display based on the first score and the second score, determine an application usage time within the geographic area, the application usage time representing an amount of time that other client computing devices in the geographic area spend using the application, compare the application usage time with an application usage time threshold, and include the geographic area in the location data in response to the application usage time being greater than the application usage time threshold.

20. The mobile computing device of claim 19, wherein the computing processor is further configured to determine the first score for the first application record and the second score for the second application record by:

selecting the first score for the first application record in response to the first distance scoring feature indicating that the first distance between the search location and the first geographic area indicated by the first location data of the first application record is less than a threshold distance; and selecting the second score for the second application record in response to the second distance scoring feature indicating that the second distance between the search location and the second geographic area indicated by the second location data of the second application record is greater than the threshold distance, the second score being less than the first score.

21. The mobile computing device of claim 19, wherein the computing processor is further configured to display an application identifier of an application record with a highest score.

22. The mobile computing device of claim 19, wherein the consideration set of application records comprises the first application record associated with the first geographic area and the second application record associated with the second geographic area that is different from the first geographic area.

23. The mobile computing device of claim 22, wherein the computing processor is further configured to:
   display the application identifier for the first application record in response to determining that the search location in within the first geographic area; and
   filter out the application identifier for the second application record in response to determining that the search location is outside the second geographic area.

* * * * *